(12) United States Patent
Mizuno

(10) Patent No.: US 7,677,118 B2
(45) Date of Patent: Mar. 16, 2010

(54) MAGNETOSTRICTIVE LOAD SENSOR AND MOVEABLE OBJECT INCLUDING THE SAME

(75) Inventor: Yutaka Mizuno, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 98 days.

(21) Appl. No.: 11/994,162

(22) PCT Filed: Jun. 27, 2006

(86) PCT No.: PCT/JP2006/312816

§ 371 (c)(1),
(2), (4) Date: Dec. 28, 2007

(87) PCT Pub. No.: WO2007/004472

PCT Pub. Date: Jan. 11, 2007

(65) Prior Publication Data

US 2009/0114040 A1 May 7, 2009

(30) Foreign Application Priority Data

Jul. 1, 2005 (JP) .............................. 2005-193687

(51) Int. Cl.
*G01L 1/12* (2006.01)
(52) U.S. Cl. .................................. 73/862.69
(58) Field of Classification Search .............. 73/862.69, 73/777
See application file for complete search history.

(56) References Cited

U.S. PATENT DOCUMENTS

| 3,440,871 A | * | 4/1969 | Vissnia ..................... 73/862.69 |
| 6,345,544 B1 | | 2/2002 | Mizuno et al. |
| 7,062,981 B1 | | 6/2006 | Spohr |
| 7,458,276 B2 | * | 12/2008 | Mizuno et al. ................. 73/779 |
| 2004/0107777 A1 | | 6/2004 | Lequesne et al. |

FOREIGN PATENT DOCUMENTS

| JP | 06-241920 A | 9/1994 |
| JP | 11-183275 A | 7/1999 |
| JP | 2001-249554 A | 9/2001 |
| JP | 2001-281074 A | 10/2001 |
| JP | 2003-057127 A | 2/2003 |
| JP | 2003-057128 A | 2/2003 |
| JP | 2003-194638 A | 7/2003 |
| JP | 2004-184187 A | 7/2004 |
| JP | 2004-226196 A | 8/2004 |

OTHER PUBLICATIONS

Official Communication issued in International Patent Application No. PCT/EP2006/312816, mailed on Sep. 26, 2006.

* cited by examiner

*Primary Examiner*—Lisa M Caputo
*Assistant Examiner*—Octavia Davis
(74) *Attorney, Agent, or Firm*—Keating & Bennett, LLP

(57) ABSTRACT

A magnetostrictive load sensor includes a coil, a magnetic path forming member composed of a magnetic material, a rod composed of a magnetic material, two load transmitting members, a housing, and two load applicators. Openings are respectively formed at the approximate centers at both ends of the magnetic path forming member that covers the outer periphery and both ends of the coil. The rod is inserted into a through hole of the coil and the openings. Both ends of the rod respectively project through the openings, and the rod is arranged so as not to come into contact with the magnetic path forming member. Both the ends of the rod are respectively supported by the load transmitting members. Respective portions of the load transmitting members project outward through an opening of the housing.

19 Claims, 20 Drawing Sheets

POSITION OF CENTRAL AXIS OF ROD

F I G. 7A
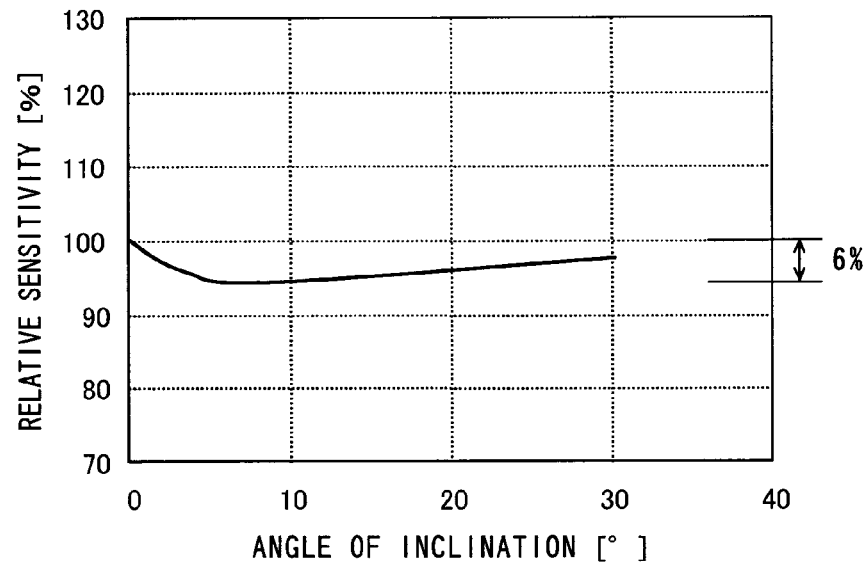
F I G. 7B
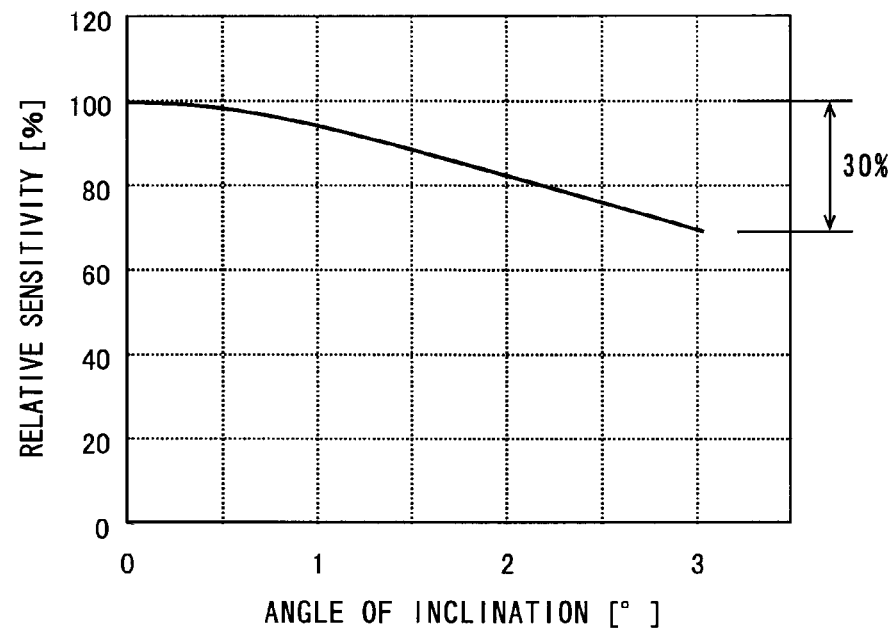

MAGNETOSTRICTIVE LOAD SENSOR AND MOVEABLE OBJECT INCLUDING THE SAME

BACKGROUND OF THE INVENTION

1. Field of the Invention

The present invention relates to a magnetostrictive load sensor that electromagnetically detects a load using a magnetostrictive effect and a movable object including the same.

2. Description of the Related Art

Load sensors used for movable objects such as motorcycles, water bikes, mobile racks, transport equipment, power-assisted bicycles, or electric wheelchairs are required to be miniaturized. Magnetostrictive load sensors have been put to practical use as small-sized load sensors.

The magnetostrictive load sensors convert changes in magnetic properties of members to which loads are applied into changes in voltages and detect the loads on the basis of the changes in the voltages.

JP 11-241955 A discloses a load detecting device serving as a magnetostrictive load sensor. The load detecting device disclosed in JP 11-241955A includes rod-shaped magnetic body, an exciting coil, a detecting coil, and a magnetic shield case.

The rod-shaped magnetic body is formed of a magnetic material. The exciting coil and the detecting coil are wound around the magnetic body with the coils electrically insulated from each other. The magnetic shield case is formed of a magnetic material, and accommodates the magnetic body, the exciting coil, and the detecting coil.

One end of the magnetic body projects upward through a hole provided at the top of the magnetic shield case. A joint is provided at an upper end of the magnetic body.

The load is applied to the magnetic body through a joint with the magnetic body magnetized by the exciting coil. This causes the magnetic body to be compressed when the load is applied in the axial direction of the magnetic body. As a result, the impedance of the load detecting device changes by an inverse magnetostrictive effect, and a voltage across both ends of the detecting coil changes. Therefore, the load applied to the magnetic body is calculated on the basis of the change in the voltage in the detecting coil.

In the load detecting device disclosed in JP 11-241955 A described above, however, the magnetic shield case formed of a magnetic material supports a lower end of the rod-shaped magnetic body and covers the respective outer peripheries, tops, and bottoms of the exciting coil and the detecting coil. This causes the magnetic shield case to function as a magnetic path when the magnetic body is magnetized by the exciting coil.

The magnetic shield case supports a lower end of the magnetic body. When the load is applied to the upper end of the magnetic body, therefore, a stress is also exerted on an abutment portion of the lower end of the magnetic body and the magnetic shield case.

When the direction of the load applied to the magnetic body is shifted from the axial direction of the magnetic body, a stress distribution at the lower end of the magnetic body becomes non-uniform, so that a stress concentrated portion occurs. When the direction of the load applied to the magnetic body differs, the position and the size of the stress concentrated portion occurring at the lower end of the magnetic body also differ. Even if the load applied to the magnetic body is fixed, therefore, the magnetic properties at the lower end of the magnetic body vary depending on the position and the size of the occurring stress concentrated portion.

Furthermore, the lower end of the magnetic body and the magnetic shield case are abutted against each other. When the stress concentrated portion occurs at the lower end of the magnetic body, therefore, a stress concentrated portion corresponding to the position and the size of the stress concentrated portion occurring in the magnetic body also occurs in the abutment portion of the magnetic shield case and the magnetic body. In the magnetic shield case, therefore, the magnetic properties also vary depending on the position and the size of the stress concentrated portion occurring in the magnetic body.

When the direction of the load applied to the magnetic body differs, the change in the voltage across both the ends of the detecting coil vary under the effects of the variation in the magnetic properties at the lower end of the magnetic body and the variation in the magnetic properties of the magnetic shield case. As a result, the variation in the output of the load detecting device increases, so that the reliability of the load detecting device is degraded.

Furthermore, even when the direction of the load applied to the magnetic body coincides with the axial direction of the magnetic body, the stress distribution at the lower end of the magnetic body becomes non-uniform, so that the stress concentrated portion occurs when errors only slightly occur in the shape and the size of the abutment portion of the magnetic body and the magnetic shield case.

When load detecting devices, described above, are mass-produced, the voltage across both the ends of the detecting coil varies between the load detecting devices due to the errors in the shape and the size of the abutment portion of the magnetic body and the magnetic shield case. As a result, the manufacturing yield of the load detecting device is reduced.

SUMMARY OF THE INVENTION

In order to overcome the problems described above, preferred embodiments of the present invention provide a magnetostrictive load sensor whose reliability and manufacturing yield are improved and that prevents changes in its output from varying due to a stress concentration and a movable object including the same.

According to a preferred embodiment of the present invention, a magnetostrictive load sensor includes a coil having a through hole, a load detector inserted into the through hole, and a magnetic path forming member that forms a magnetic path through which a magnetic flux generated by the coil passes, in which both ends of the load detector respectively project outward beyond portions, of the magnetic path forming member, which is opposite to the through hole. The magnetostrictive load sensor further includes a load transmitting member that transmits a load externally applied to at least one end of the load detector, and a supporting member that supports the magnetic path forming member and the load transmitting member.

In the magnetostrictive load sensor according to a preferred embodiment of the present invention, the magnetic path forming member and the load transmitting member are supported by the supporting member. With a current caused to flow through the coil, a magnetic field is generated. This causes the load detector composed of a magnetic material to be magnetized.

In this state, when the load is applied to at least one of both the ends of the load detector that respectively project outward beyond the portions of the magnetic path forming member, the load detector is distorted. This causes the impedance of the coil to change while causing a voltage induced in the coil to change. Therefore, the load can be detected on the basis of the change in the voltage.

Here, when the load is applied in a direction shifted from the central axis of the load detector, a distribution of a stress exerted on the end of the load detector becomes non-uniform. This causes stress concentrated portions to occur at both the ends of the load detector.

Furthermore, when the direction and the position of the load applied to the load detector through the load transmitting member differs, the respective positions and sizes of the stress concentrated portions occurring at both the ends of the load detector also differ. Even when the load applied to the load detector is fixed, therefore, the magnetic properties at the end of the load detector vary depending on the position and the size of the occurring stress concentrated portion.

In the magnetostrictive load sensor according to a preferred embodiment of the present invention, both the ends of the load detector project outward beyond the magnetic path forming member. In other words, when the magnetostrictive load sensor is operated, both the ends of the load detector are positioned outside the magnetic path formed by the magnetic path forming member.

As a result, an output of the magnetostrictive load sensor is prevented from being affected by the stress concentrated portion occurring at the end of the load detector. Therefore, the output of the magnetostrictive load sensor is stabilized.

Even when the stress concentrated portion occurs at the end of the load detector due to errors in the respective shapes and sizes of the magnetic path forming member, the load detector, the load transmitting member, and the supporting member, the change in the output of the magnetostrictive load sensor is prevented from varying due to the effect of the stress concentrated portion occurring at the end of the load detector.

Accordingly, the respective shape and dimensional accuracies of the magnetic path forming member, the load detector, the load transmitting member, and the supporting member in mass-producing the magnetostrictive load sensors are alleviated. As a result, the manufacturing yield of the magnetostrictive load sensor is improved.

The supporting member may support the load detector through the load transmitting member such that the load detector is movable in a predetermined range.

In this case, the load detector can move in the predetermined range. Therefore, a stress concentration occurring at the end of the load detector due to the direction in which the load is applied is reduced. This sufficiently prevents the change in the output of the magnetostrictive load sensor from varying. Furthermore, the manufacturing yield of the magnetostrictive load sensor is further improved.

The supporting member may support the load detector through the load transmitting member such that the load detector and the magnetic path forming member are not brought into contact with each other. In this case, when the magnetostrictive load sensor is operated, a magnetic resistance is prevented from significantly changing between the load detector and the magnetic path forming member. This prevents the change in the output of the magnetostrictive load sensor from varying due to the effect of the change in the magnetic resistance between the load detector and the magnetic path forming member.

Furthermore, in the magnetic path forming member, no stress concentrated portion occurs due to contact with the load detector. Therefore, the magnetic properties of the magnetic path forming member do not vary. As a result, the change in the output of the magnetostrictive load sensor is prevented from varying.

A gap forming member composed of a non-magnetic material may be provided between the load detector and the magnetic path forming member. In this case, when the magnetostrictive load sensor is operated, contact between the magnetic path forming member and the load detector is reliably prevented. This can reliably prevent the magnetic resistance from significantly changing between the load detector and the magnetic path forming member.

Furthermore, even when the load detector moves within the predetermined range, the gap forming member limits a shift amount in a positional relationship between the load detector and the magnetic path forming member to a smaller value. This causes the change in the impedance of the coil due to the shift in the positional relationship between the magnetic path forming member and the load detector to be sufficiently reduced. Accordingly, the stability of the output of the magnetostrictive load sensor is improved.

The supporting member may support the load transmitting member such that the load transmitting member is movable in a predetermined range.

In this case, the load transmitting member can move in the predetermined range, so that the stress concentration occurring at the end of the load detector due to the direction in which the load is applied is reduced. This sufficiently prevents the change in the output of the magnetostrictive load sensor from varying. Furthermore, the manufacturing yield of the magnetostrictive load sensor is further improved.

The supporting member may support the load transmitting member through an elastic body. In this case, with the load transmitting member supported by the supporting member through the elastic body, the load transmitting member is movable in the predetermined range. Even when errors occur in the respective shapes and sizes of the load detector, this causes the load transmitting member, and the supporting member, the load transmitting member to be supported with the effect of the errors being absorbed by the elastic body. Accordingly, the respective shape and dimensional accuracies of the load detector, the load transmitting member, and the supporting member are alleviated. Therefore, the manufacturing yield of the magnetostrictive load sensor is improved.

The supporting member may include a housing accommodating the coil, the magnetic path forming member, the load detector, and the load transmitting member.

In this case, the coil, the magnetic path forming member, the load detector, and the load transmitting member are accommodated within the housing. This makes it easy to handle the magnetostrictive load sensor. Furthermore, the coil, the magnetic path forming member, the load detector, and the load transmitting member can be prevented from being contaminated, which can prevent the magnetostrictive load sensor from being degraded.

The magnetic path forming member may have first and second openings in portions which are respectively opposite to both ends of the through hole, first gaps may be respectively formed between an outer surface of the load detector and inner surfaces of the first and second openings, the housing may have a third opening in which the load transmitting member is fitted such that the load detector and the load transmitting member are integrally movable in a predetermined range, a second gap may be formed between an outer surface of the load transmitting member and an inner surface of the third opening, and the width of the second gap may be not more than the width of the first gap.

In this case, the first gap allows the load detector to move in a direction crossing the axis of the through hole of the coil within the first and second openings of the magnetic path forming member. Furthermore, the second gap allows the load transmitting member to move in the direction crossing the axis of the through hole of the coil within the third opening of the housing.

The width of the second gap is not more than the width of the first gap, which prevents the load detector and the magnetic path forming member from coming into contact with each other with the load transmitting member and the load detector supported movably in the direction crossing the axis of the through hole of the coil.

Therefore, the stress concentration occurring at the end of the load detector due to the direction in which the load is applied is reduced. This sufficiently prevents the change in the output of the magnetostrictive load sensor from varying. Furthermore, the manufacturing yield of the magnetostrictive load sensor is further improved.

When the magnetostrictive load sensor is operated, a magnetic resistance is prevented from significantly changing between the load detector and the magnetic path forming member. This prevents the change in the output of the magnetostrictive load sensor from varying due to the effect of the change in the magnetic resistance between the load detector and the magnetic path forming member.

Furthermore, in the magnetic path forming member, no stress concentrated portion occurs due to contact with the load detector. Therefore, the magnetic properties of the magnetic path forming member do not vary. As a result, the change in the output of the magnetostrictive load sensor is prevented from varying.

The magnetostrictive load sensor may further include a load applicator that is arranged so as to be movable in a predetermined range and so as to be a butt able against the load detector and apply a load to the load detector through the load transmitting member.

In this case, the load applicator applies the load to the load detector through the load transmitting member. This allows the load to be reliably applied to the load detector.

The magnetic path forming member may have first and second openings in portions which are respectively opposite to both ends of the through hole, first gaps may be respectively formed between an outer surface of the load detector and inner surfaces of the first and second openings, the housing may have a third opening in which the load transmitting member is fitted such that the load detector and the load transmitting member are integrally movable in a predetermined range, a second gap may be formed between an outer surface of the load transmitting member and an inner surface of the third opening, and the width of the second gap may be not more than the width of the first gap. The magnetostrictive load sensor may further include a load applicator that applies a load to the load detector through the load transmitting member. The load applicator may be arranged so as to be movable in a range greater than the width of the first gap in a direction that is perpendicular or substantially perpendicular to the axial direction of the through hole.

In this case, the first gap allows the load detector to move in the direction crossing the axis of the through hole of the coil within the first and second openings of the magnetic path forming member. Furthermore, the second gap allows the load transmitting member to move in the direction crossing the axis of the through hole of the coil within the third opening of the housing.

The load detector and the load transmitting member integrally move within the housing. Thus, a range in which the load detector is movable is not more than a range in which the load transmitting member is movable in the direction crossing the axis of the through hole of the coil.

Here, the width of the second gap is not more than the width of the first gap, which prevents the load detector and the magnetic path forming member from coming into contact with each other with the load transmitting member and the load detector supported movably in the direction crossing the axis of the through hole of the coil.

The load applicator applies the load to the load detector through the load transmitting member. This allows the load to be reliably applied to the load detector. Here, the load applicator is movable in the range greater than the width of the first gap in the direction crossing the axis of the through hole of the coil. Thus, the range in which the load transmitting member is movable is not more than a range in which the load applicator is movable in the direction crossing the axis of the through hole of the coil.

In the direction crossing the axis of the through hole of the coil, the range in which the load transmitting member is movable is not more than the range in which the load applicator is movable. When the direction of the load applied to the load transmitting member by the load applicator is inclined to the axis of the through hole of the coil, therefore, the movement amount of the load transmitting member is not more than the movement amount of the load applicator.

Furthermore, in the direction crossing the axis of the through hole of the coil, the range in which the load detector is movable is not more than the range in which the load transmitting member is movable. When the direction of the load applied to the load detector by the load transmitting member is inclined to the axis of the through hole of the coil, therefore, the movement amount of the load detector is not more than the movement amount of the load transmitting member.

As a result, the shift in the position of the load detector from the magnetic path forming member and the inclination thereto can be reduced, which sufficiently prevents the change in the output of the magnetostrictive load sensor from varying.

The load transmitting member may include first and second load transmitting members that respectively transmit the load externally applied to the one end and the other end of the load detector.

In this case, the magnetostrictive load sensor can respectively detect the loads applied to the one end and the other end of the load detector. This allows the loads applied from the two directions to be detected by the one magnetostrictive load sensor. In order to detect the loads applied from the two directions, therefore, magnetostrictive load sensors respectively corresponding to the respective directions need not be prepared, so that the number of components is reduced. This causes the magnetostrictive load sensor to be miniaturized and made lightweight.

Furthermore, the one magnetostrictive load sensor can detect the loads respectively applied from the two directions. Therefore, the necessities of adjusting the sensitivities of the two magnetostrictive load sensors and selecting the two magnetostrictive load sensors, as in a case where two magnetostrictive load sensors are prepared, are eliminated. As a result, the number of manufacturing processes and the manufacturing cost of the magnetostrictive load sensor are reduced, so that the manufacturing yield is improved.

The magnetostrictive load sensor may further include first and second load applicators that are arranged so as to be movable in a predetermined range and so as to be abuttable against the load transmitting member and respectively apply the load to the one end and the other end of the load detector through the first and second load transmitting members.

In this case, the first and second load applicators respectively apply the loads to both the ends of the load detector through the first and second load transmitting members. This allows the load to be reliably applied to both the ends of the load detector.

The first and second load applicators and the first and second load transmitting members may be arranged so as to be symmetrical about the load detector along the axis of the through hole of the coil.

In this case, the load is transmitted to the load detector through symmetrical paths, respectively, when the first load applicator applies the load to the first load transmitting member positioned at the one end of the load detector and when the second load applicator applies the load to the second load transmitting member positioned at the other end of the load detector. Therefore, the magnetostrictive load sensor can detect the loads respectively applied from the two directions with the same accuracy.

The housing may have a third opening in which the load transmitting member is fitted, and the load transmitting member may have a flange that is opposite to or brought into contact with one inner end surface of the housing and a recess in which the one end of the load detector is fitted.

In this case, the one end of the load detector is fitted in the recess of the load transmitting member, the load transmitting member is fitted in the third opening of the housing, and the flange is opposite to or brought into contact with the one inner end surface of the housing. This causes the load detector and the load transmitting member to be held within the housing movably in the axial direction. Therefore, the load can be accurately detected in a simple configuration.

A gap may be formed between an inner surface of the third opening of the housing and an outer surface of the load transmitting member. The magnetostrictive load sensor may further include an elastic member that holds the load transmitting member so as to be movable relative to the housing in a direction that is perpendicular or substantially perpendicular to the axial direction of the through hole.

In this case, when the load is applied to the load transmitting member in a direction inclined to the axial direction of the through hole of the coil, the load transmitting member elastically moves in the direction that is perpendicular or substantially perpendicular to the axial direction of the through hole. Therefore, the stress concentration occurring at the one end of the load detector due to the direction in which the load is applied is reduced. This sufficiently prevents the change in the output of the magnetostrictive load sensor from varying.

The load detector may include first and second load transmitting members that respectively transmit the load externally applied to the one end and the other end of the load detector, the housing may have a third opening in which the first load transmitting member is fitted and a fourth opening in which the second load transmitting member is fitted, the first load transmitting member may have a first flange that is opposite to or brought into contact with one inner end surface of the housing and a first recess in which the one end of the load detector is fitted, and the second load transmitting member may have a second flange that is opposite to or brought into contact with the other inner end surface of the housing and a second recess in which the other end of the load detector is fitted.

In this case, the one end of the load detector is fitted in the first recess of the first load transmitting member, the first load transmitting member is fitted in the third opening of the housing, and the first flange is opposite to or brought into contact with the one inner end surface of the housing. Furthermore, the other end of the load detector is fitted in the second recess of the second load transmitting member, the second load transmitting member is fitted in the fourth opening of the housing, and the second flange is opposite to or brought into contact with the other inner end surface of the housing. This causes the first and second load detectors and the first and second load transmitting members to be held within the housing movably in the axial direction. Therefore, the load can be accurately detected in a simple configuration.

A gap may be formed between an inner surface of the third opening of the housing and an outer surface of the first load transmitting member, and a gap is formed between an inner surface of the fourth opening of the housing and an outer surface of the second load transmitting member. The magnetostrictive load sensor may further include a first elastic member that holds the first load transmitting member so as to be movable relative to the housing in a direction that is perpendicular or substantially perpendicular to the axial direction of the through hole, and a second elastic member that holds the second load transmitting member so as to be movable relative to the housing in the direction that is perpendicular or substantially perpendicular to the axial direction of the through hole.

In this case, when the load is applied to the first or second load transmitting member in a direction inclined to the axial direction of the through hole of the coil, the first or second load transmitting member elastically moves in the direction that is perpendicular or substantially perpendicular to the axial direction of the through hole. This causes the stress concentration occurring at the one end or the other end of the load detector due to the direction in which the load is applied to be reduced. Therefore, the variation in the change in the output of the magnetostrictive load sensor is sufficiently reduced.

The load detector and the load transmitting member may be joined to each other. In this case, on the axis of the through hole of the coil, a compressive load can be applied to the load detector through the load transmitting member, and a tensile load can be applied to the load detector through the load transmitting member. Therefore, it is possible to detect the compressive load and the tensile load with the change in the output prevented from varying due to the stress concentration.

The load detector may have a pillar shape, and both the ends of the load detector may respectively project through the first and second openings of the magnetic path forming member by a length that is not less than the diameter of a cross section in the axial direction of the load detector.

In this case, even when the stress is exerted in a locally concentrated manner at the end of the load detector, the stress spreads to the whole surface of the load detector within its projections because both the ends of the load detector project through the first and second openings by a length that is not less than the diameter of the load detector. This causes the stress distribution in the load detector to be made substantially uniform in a portion, covered with the magnetic path forming member, of the load detector. As a result, the change in the output of the magnetostrictive load sensor is prevented from varying due to the effect of the stress concentrated portion occurring at the end of the load detector.

According to another preferred embodiment of the present invention, a movable object includes a main body, a driving unit that moves the main body, a magnetostrictive load sensor that detects a load, and a controller that controls the driving unit on the basis of the load detected by the magnetostrictive load sensor, in which the magnetostrictive load sensor includes a coil having a through hole, a load detector inserted into the through hole, and a magnetic path forming member that forms a magnetic path through which a magnetic flux generated by the coil passes, and both ends of the load detector respectively project outward beyond portions, of the magnetic path forming member, which is opposite to the through hole. The movable object further includes a load transmitting member that transmits a load externally applied to at least one end of the load detector, and a supporting member that supports the magnetic path forming member and the load transmitting member.

In the movable object, the magnetostrictive load sensor detects the load, and the controller controls the driving unit on the basis of the detected load. This causes the driving unit to move the main body.

In the magnetostrictive load sensor used for the movable object, the change in its output is prevented from varying due to a stress concentration, so that the reliability and the manufacturing yield thereof are improved. This allows the movable object to be controlled with high accuracy and causes the reliability of the movable object to be improved.

According to various preferred embodiments of the present invention, both ends of the load detector project outward beyond the magnetic path forming member. This prevents the output of the magnetostrictive load sensor from being affected by the stress concentrated portion occurring at the end of the load detector, so that the output of the magnetostrictive load sensor is stabilized.

Furthermore, even when the stress concentrated portion occurs at the end of the load detector due to the errors in the respective shapes and sizes of the magnetic path forming member, the load detector, the load transmitting member, and the supporting member, the same effect as the foregoing is produced. That is, the change in the output of the magnetostrictive load sensor is prevented from varying due to the effect of the stress concentrated portion occurring at the end of the load detector.

Accordingly, the respective shape and dimensional accuracies of the magnetic path forming member, the load detector, the load transmitting member, and the supporting member in mass-producing the magnetostrictive load sensors are alleviated. As a result, the manufacturing yield of the magnetostrictive load sensor is improved.

Furthermore, the movable object using the magnetostrictive load sensor can be controlled with high accuracy, and the reliability of the movable object is improved.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 7A and 7B are diagrams for explaining a relationship between an angle of inclination, in a direction in which a load is applied, to the central axis of the rod and the sensitivity of the magnetostrictive load sensor.

DETAILED DESCRIPTION OF THE PREFERRED EMBODIMENTS

Figure 1:
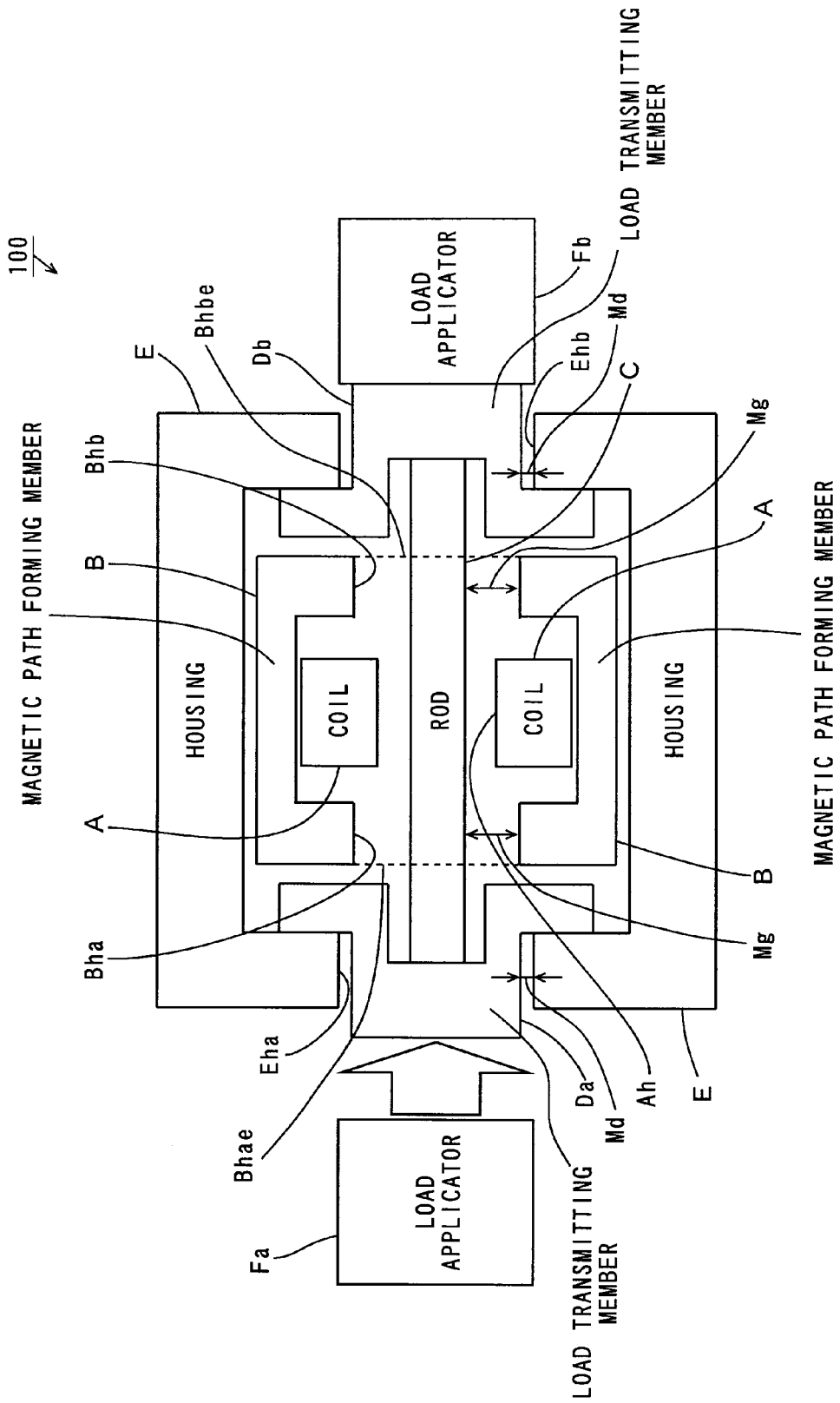
FIG. 1 is a diagram for explaining the basic configuration of a magnetostrictive load sensor according to a first preferred embodiment of the present invention.

Preferred embodiments of the present invention will be described in detail referring to the drawings. The preferred embodiments below describe a magnetostrictive load sensor.

First Preferred Embodiment (1) Basic Configuration of Magnetostrictive Load Sensor FIG. 1 is a diagram for explaining the basic configuration of a magnetostrictive load sensor 100 according to a first preferred embodiment of the present invention.

As shown in FIG. 1, the magnetostrictive load sensor 100 according to the first preferred embodiment includes a coil A, a magnetic path forming member B composed of a magnetic material, a rod C composed of a magnetic material, two load transmitting members Da and Db composed of a non-magnetic material, a housing E composed of a non-magnetic material, and two load applicators Fa and Fb.

In the following description, the rod C functions as a load detector that detects a load applied to the magnetostrictive load sensor 100.

In the following description, an assembly including the coil A, the magnetic path forming member B, and the rod C is referred to as a sensor constituent member.

Here, the magnetic material means a material having the property of being magnetized when it is placed in a magnetic field. Examples of the magnetic material include an iron-based material, an iron chromium-based material, an iron nickel-based material, an iron cobalt-based material, an iron silicon-based material, an iron aluminum-based material, pure iron, permalloy or a super magnetostrictive material, and ferritic stainless (e.g., SUS 430). For example, the relative permeability (a ratio corresponding to an absolute permeability of vacuum) of iron serving as a magnetic material is 200.

The non-magnetic material means a material other than the magnetic material and having a relative permeability of approximately one, for example. The respective relative permeabilities of austenitic stainless (e.g., SUS 304), aluminum, and copper serving as a non-magnetic material are 1 to 1.01.

The coil A has a through hole Ah. The magnetic path forming member B is formed so as to cover the outer periphery and both ends of the coil A. Openings Bha and Bhb are respectively formed at the centers at both the ends of the magnetic path forming member B.

The rod C is inserted into the through hole Ah and the openings Bha and Bhb. In this state, both ends of the rod C project through the openings Bha and Bhb. More specifically, the rod C extends outward from lines Bhae and Bhbe connecting outer ends of the openings Bha and Bhb (outward in a longitudinal direction of the rod C). Furthermore, a distance Mg between the magnetic path forming member B and the rod C is greater than a distance Md between the housing E and the load transmitting members Da and Db. Thus, the rod C is arranged so as not to come into contact with the magnetic path forming member B.

The one end of the rod C is fitted in the load transmitting member Da composed of a non-magnetic material. The other end of the rod C is fitted in the load transmitting member Db composed of a non-magnetic material.

The coil A, the magnetic path forming member B, the rod C, and the two load transmitting members Da and Db are accommodated within the housing E. Openings Eha and Ehb are respectively formed at the centers at both ends of the housing E.

Respective portions of the load transmitting members Da and Db respectively project outward through the openings Eha and Ehb of the housing E. The load applicator Fa is arranged so as to be abuttable against the load transmitting member Da projecting outward through the opening Eha. The load applicator Fb is arranged so as to be abuttable against the load transmitting member Db projecting outward through the opening Ehb.

A lead wire extending from the coil A is pulled out of the housing E, which is not illustrated in FIG. 1. The lead wire pulled out of the housing E is connected to peripheral circuits (load detecting circuits) such as an oscillating circuit, a current detector, a rectifying circuit, an amplifying circuit, and a central processing circuit (CPU), which are not illustrated.

(2) Operation of Magnetostrictive Load Sensor

When the magnetostrictive load sensor 100 is operated, an AC current is supplied to the coil A through the lead wire by the oscillating circuit serving as the peripheral circuit (not shown). This causes the coil A to be driven. In this case, the coil A functions as an exciting coil, to magnetize the rod C. Furthermore, the magnetic path forming member B functions as a magnetic path.

Figure 2:
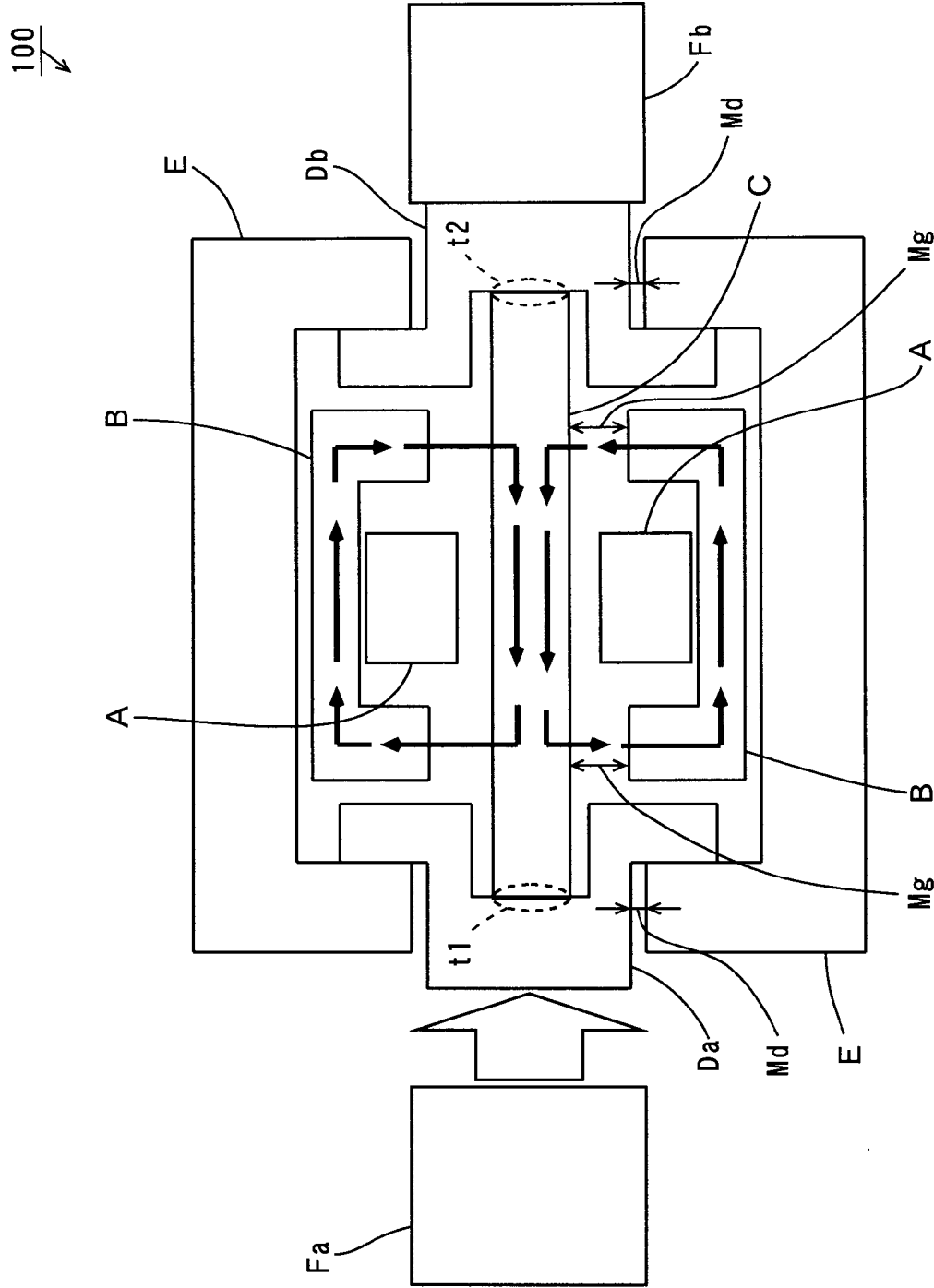
FIG. 2 is a diagram showing the direction of a magnetic field in the magnetostrictive load sensor shown in FIG. 1.

FIG. 2 shows the direction of the magnetic field in the magnetostrictive load sensor 100 shown in FIG. 1. In FIG. 2, the direction of the magnetic field in the magnetostrictive load sensor 100 with the coil A driven is indicated by thick arrows.

The load applicator Fa applies a load to the load transmitting member Da. The load applied to the load transmitting member Da is transmitted to the one end of the rod C.

This causes a compressive force to be exerted on the rod C. When the compressive force is thus exerted on the rod C, the permeability of the rod C changes due to an inverse magnetostrictive effect, so that the impedance of the sensor constituent member including the coil A, the magnetic path forming member B, and the rod C changes.

As a result, an induced electromotive force (a voltage) generated in the coil A changes. In this case, the coil A functions as a detecting coil. The voltage in the coil A is detected by the peripheral circuit through the lead wire (not shown). The load applied to the load transmitting member Da is detected on the basis of the change in the detected voltage in the coil A.

On the other hand, the load applicator Fb applies a load to the load transmitting member Db. In this case, the load applied to the load transmitting member Db is also detected in the foregoing manner.

(3) Effect of Magnetostrictive Load Sensor According to First Preferred Embodiment (3-a)

When the load is applied to the load transmitting member Da or Db, a stress is exerted on an abutment portion of the one end of the rod C and the load transmitting member Da (see a dotted line t1 in FIG. 2) and an abutment portion of the other end of the rod C and the load transmitting member Db (see a dotted line t2 in FIG. 2), and a compressive force is exerted on the rod C.

Here, when the direction of the load applied to the load transmitting member Da or Db is shifted from the axial direction of the rod C, a stress distribution at both the ends of the rod C becomes non-uniform, so that stress concentrated portions occur.

Furthermore, when the direction of the load applied to the load transmitting member Da or Db differs, the respective positions and sizes of the stress concentrated portions occurring at both the ends of the rod C also differ. Even when the load applied to the rod C is fixed, therefore, the magnetic properties at both the ends of the rod C vary depending on the respective positions and sizes of the occurring stress concentrated portions.

In the magnetostrictive load sensor 100 according to the present preferred embodiment, both the ends of the rod C project outward beyond the magnetic path forming member B. In other words, when the magnetostrictive load sensor 100 is operated, both the ends of the rod C are positioned outside the magnetic path formed by the magnetic path forming member B.

As a result, an output of the magnetostrictive load sensor 100 is not affected by the stress concentrated portions occurring at both the ends of the rod C. Therefore, the output of the magnetostrictive load sensor 100 is stabilized.

(3-b)

When a contact state and a non-contact state alternately a rise between the magnetic path forming member B and the rod C, a magnetic resistance between the magnetic path forming member B and the rod C significantly changes.

In the magnetostrictive load sensor 100 according to the present preferred embodiment, the rod C is arranged so as not to come into contact with the magnetic path forming member B. Therefore, the magnetic resistance is prevented from significantly changing between the magnetic path forming member B and the rod C. As a result, the change in the output of the magnetostrictive load sensor 100 is prevented from varying due to the effect of the change in the magnetic resistance between the magnetic path forming member B and the rod C.

Since the distance Mg between the magnetic path forming member B and the rod C is greater than the distance Md between the housing E and the load transmitting members Da and Db, the rod C is not brought into contact with the magnetic path forming magnetic member B. Thus, in the magnetic path forming member B, no stress concentrated portion occurs due to contact with the rod C. Therefore, the magnetic properties of the magnetic path forming member B do not vary. As a result, the change in the output of the magnetostrictive load sensor 100 is prevented from varying.

(3-c)

When the magnetic path forming member B and the rod C are not brought into contact with each other, a connection between the one end of the rod C and the load transmitting member Da and a connection between the other end of the rod C and the load transmitting member Db are positioned outside the magnetic path forming member B.

Even when the stress concentrated portions occur at both the ends of the rod C due to the errors in the respective shapes and sizes of the magnetic path forming member B, the rod C, and the load transmitting members Da and Db, therefore, the output of the magnetostrictive load sensor 100 is not affected by the stress concentrated portions occurring at both the ends of the rod C. Therefore, the output of the magnetostrictive load sensor 100 is stabilized.

Accordingly, the respective shape and dimensional accuracies of the magnetic path forming member B, the rod C, and the load transmitting members Da and Db in mass-producing the magnetostrictive load sensors 100 are alleviated. As a result, the manufacturing yield of the magnetostrictive load sensor 100 is improved.

(3-d)

When an apparatus that detects loads applied from two directions using two load sensors is manufactured, it is necessary to adjust the sensitivities of the two load sensors to be equal. Alternatively, two load sensors having an equal sensitivity are selected. This causes the number of manufacturing processes and the manufacturing cost to be increased.

In the magnetostrictive load sensor 100 according to the present preferred embodiment, the loads respectively applied to the one end and the other end of the rod C can be detected. This allows the loads applied from two directions to be detected by the one magnetostrictive load sensor 100. Therefore, the necessity of separately providing load sensors, respectively, to detect the loads applied from the two directions is eliminated, so that the number of components is reduced. This causes the magnetostrictive load sensor 100 to be miniaturized and made lightweight.

Furthermore, the loads applied from the two directions can be detected by the one magnetostrictive load sensor 100, which eliminates the necessities of adjusting the respective sensitivities of the two load sensors and selecting the two load sensors. As a result, the number of manufacturing processes and the manufacturing cost of the magnetostrictive load sensor 100 are reduced, so that the manufacturing yield thereof is improved.

(3-e)

The load transmitting member Da transmits the load applied by the load applicator Fa to the rod C and receives the load transmitted to the rod C through the load transmitting member Db.

Furthermore, the load transmitting member Db transmits the load applied by the load applicator Fb to the rod C and receives the load transmitted to the rod C through the load transmitting member Da.

In the magnetostrictive load sensor 100 according to the present preferred embodiment, the load transmitting members Da and Db thus have the functions of transmitting and receiving the load.

Since the necessity of separately providing the member that transmits the load and the member that receives the load is eliminated, therefore, the number of components is reduced, and the manufacturing cost is reduced.

Furthermore, the magnetostrictive load sensor 100 is arranged such that a plurality of constituent members are symmetrical with its center used as a basis. Therefore, the load is transmitted to the rod C through symmetrical paths, respectively, when the load is applied to the one end of the rod C and when the load is applied to the other end of the rod C. Therefore, the loads respectively applied from the two directions can be detected with the same accuracy.

(3-f)

In the magnetostrictive load sensor 100 according to the present preferred embodiment, the load is detected due to an inverse magnetostrictive effect. This allows the load to be detected with much higher sensitivity (several tens of times to several hundreds of times), as compared with that in a strain gauge type load cell.

Since the sensitivity for detecting the load is thus high, the necessity of forming the rod C to be fine or thin in order to improve the sensitivity, as in the strain gauge type road cell, is eliminated. Therefore, the strength of the magnetostrictive load sensor 100 is not reduced. This allows sufficient durability to be ensured.

Various specific examples of the magnetostrictive load sensor 100 according to the first preferred embodiment will be described below.

(4) First Specific Example of Magnetostrictive Load Sensor

A first specific example of the magnetostrictive load sensor 100 according to the first preferred embodiment will be described.

Figure 3:
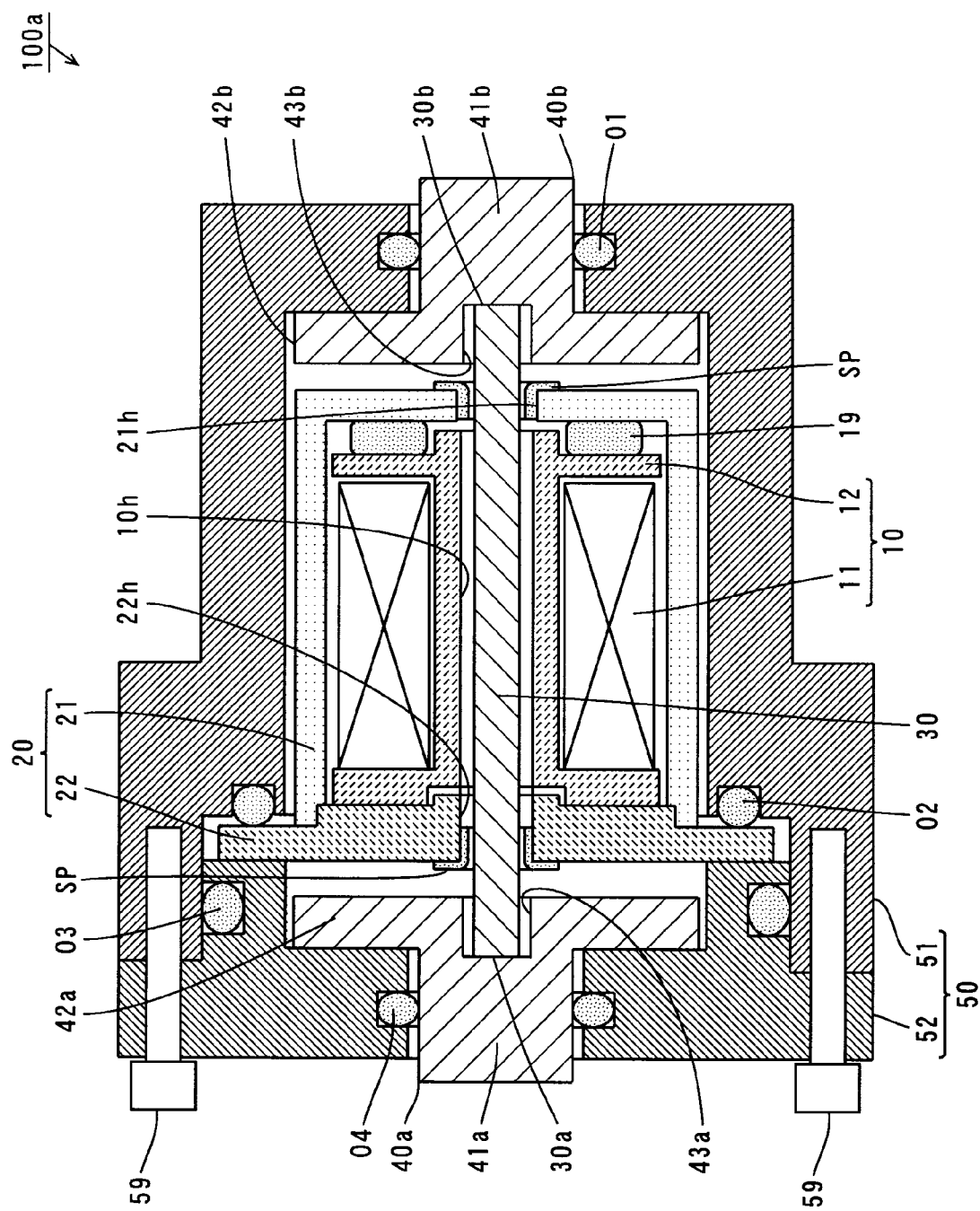
FIG. 3 is a cross-sectional view showing a first specific example of the magnetostrictive load sensor according to the first preferred embodiment of the present invention.

(4-a) Configuration of Magnetostrictive Load Sensor According to First Specific Example FIG. 3 is a cross-sectional view showing a first specific example of the magnetostrictive load sensor 100 according to the first preferred embodiment. As shown in FIG. 3, a magnetostrictive load sensor 100a according to the first specific example includes a coil 10, a magnetic path forming member 20, a rod 30, two load transmitting members 40a and 40b, and a housing 50.

The coil 10, the magnetic path forming member 20, the rod 30, the two load transmitting members 40a and 40b, and the housing 50 respectively correspond to the coil A, the magnetic path forming member B, the rod C, the two load transmitting members Da and Db, and the housing E, described above.

Furthermore, an assembly including the coil 10, the magnetic path forming member 20, and the rod 30 corresponds to the above-mentioned sensor constituent member. Therefore, the assembly including the coil 10, the magnetic path forming member 20, and the rod 30 is also referred to as a sensor constituent member in the following description.

The coil 10 includes a conductor 11 and a bobbin 12. The bobbin 12 has a longitudinal shape and has flanges at both its ends. The conductor 11 is wound between the two flanges of the bobbin 12. A through hole 10h is formed in an axial center of the bobbin 12.

The magnetic path forming member 20 includes a first casing 21 preferably having a substantially cylindrical shape and having an outer peripheral surface and one end surface and a second casing 22 having a substantially disk shape.

The first and second casings 21 and 22 are composed of a magnetic material. This causes each of the first and second casings 21 and 22 to function as a magnetic path when the magnetostrictive load sensor 100a is operated.

The coil 10 is inserted into the first casing 21 through an annular elastic member 19. The second casing 22 is connected to the other end of the first casing 21. This causes the coil 10 to be accommodated within the magnetic path forming member 20.

A circular or substantially circular opening 21h is formed at the center on one end surface of the first casing 21, and a circular or substantially circular opening 22h is formed at the center of the second casing 22.

Spacers SP are respectively attached to the openings 21h and 22h. The spacer SP is formed of a non-magnetic material.

The rod 30 having a pillar shape is inserted into a through hole 10h and the openings 21h and 22h. In this state, one end 30a and the other end 30b of the rod 30 respectively project through the openings 21h and 22h. The rod 30 is formed of a magnetic material. This causes the rod 30 to be magnetized by the coil 10 when the magnetostrictive load sensor 100a is operated.

As shown in FIG. 3, the diameter of the rod 30 is less than the inner diameter of any one of the through hole 10h and the openings 21h and 22h. Thus, gaps are respectively formed between an outer surface of the rod 30 and inner surfaces of the through hole 10h and the openings 21h and 22h. This prevents the rod 30 from coming into contact with the magnetic path forming member 20.

The above-mentioned spacer SP limits the movement of each of the members such that the rod 30, the coil 10, and the magnetic path forming member 20 are arranged in a predetermined positional relationship. The details will be described later.

The one end 30a of the rod 30 projects through the opening 22h by a length that is not less than the diameter of the rod 30, and the other end 30b of the rod 30 projects through the opening 21h by a length that is not less than the diameter of the rod 30. The details will be described later.

The rod 30 is supported by the load transmitting members 40a and 40b, described later, such that its central axis coincides with an axis connecting the respective centers of the through hole 10h and the openings 21h and 22h.

The load transmitting member 40a includes a pillar-shaped shaft 41a and a flange 42a. The flange 42a is formed at one end of the pillar-shaped shaft 41a, and a circular or substantially circular recess 43a is formed at the center of the flange 42a.

The load transmitting member 40b also includes a pillar-shaped shaft 41b and a flange 42b. The flange 42b is formed at one end of the pillar-shaped shaft 41b, and a circular or substantially circular recess 43b is formed at the center of the flange 42b. The load transmitting members 40a and 40b are formed of a non-magnetic material.

The one end 30a of the rod 30 is inserted into the recess 43a of the load transmitting member 40a and is connected thereto. Furthermore, the other end 30b of the rod 30 is inserted into the recess 43b of the load transmitting member 40b and is connected thereto.

The housing 50 includes a first housing 51 having a cylindrical or substantially cylindrical shape and having an outer peripheral surface and one end surface and a second housing 52 having a substantially disk shape. The first housing 51 and the second housing 52 are formed of a non-magnetic material.

The assembly including the coil 10, the magnetic path forming member 20, the rod 30, and the load transmitting members 40a and 40b is accommodated within the housing 51. Therefore, the first housing 51 and the second housing 52 are connected to each other with a plurality of screws 59 or other connecting members.

A plurality of O-rings O1 to O4 composed of resin or the like having an elastic force are attached to the first housing 51 and the second housing 52.

In the foregoing, examples of the magnetic material forming the first casing 21, the second casing 22, and the rod 30 include an iron-based material, an iron chromium-based material, an iron nickel-based material, an iron cobalt-based material, an iron silicon-based material, an iron aluminum-based material, pure iron, permalloy, or a super magnetostrictive material, and ferritic stainless (e.g., SUS 430). It is preferable that the first casing 21, the second casing 22, and the rod 30 are composed of the same magnetic material. In the present preferred embodiment, the SUS 430 is preferably used as the first and second casings 21 and 22 and the rod 30.

Furthermore, examples of the non-magnetic material forming the spacer SP, the load transmitting members 40a and 40b, the first housing 51, and the second housing 52 include an austenaite-based stainless, aluminum, and copper. In the present preferred embodiment, the SUS 430 is used as the load transmitting members 40a and 40b, and aluminum is used as the first and second housings 51 and 52.

(4-b) State where Each Constituent Member is Supported in Housing

Description is made of the plurality of O-rings O1 to O4 and a state where each of the constituent members is supported within the housing 50.

Figure 4:
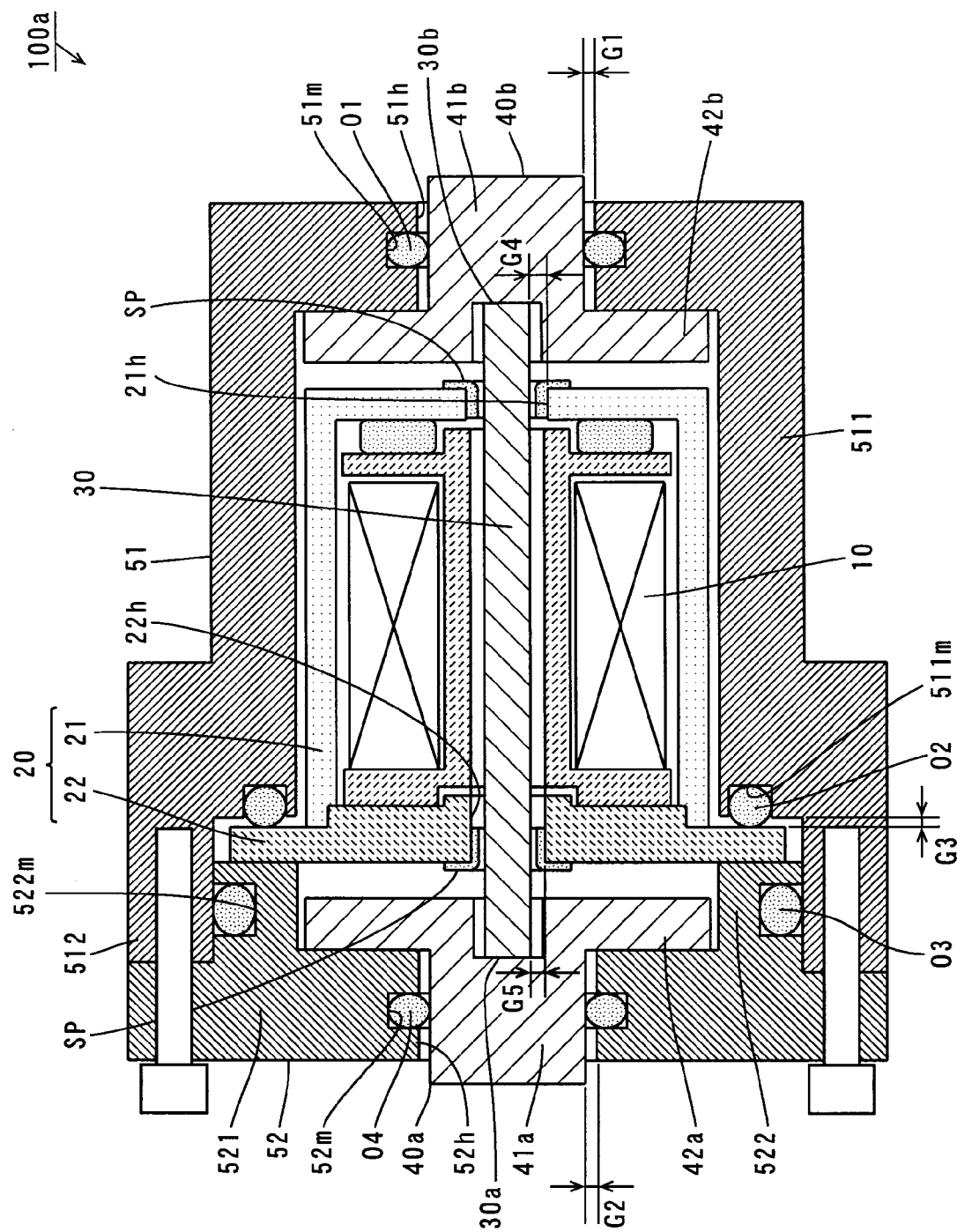
FIG. 4 is a diagram for explaining a state where each of constituent members is supported in a housing of the magnetostrictive load sensor shown in FIG. 3.

FIG. 4 is a diagram for explaining a state where each of the constituent members is supported within the housing 50 of the magnetostrictive load sensor 100a shown in FIG. 3.

As shown in FIG. 4, a circular or substantially circular opening 51h is formed at the approximate center on one end surface of the first housing 51. The diameter of the opening 51h is greater than the diameter of the shaft 41b in the load transmitting member 40b. An annular groove 51m is formed on an inner peripheral surface of the opening 51h.

When the magnetostrictive load sensor 100a is assembled, the O-ring O1 is attached to the groove 51m, and the shaft 41b in the load transmitting member 40b is inserted into the opening 51h.

Here, the diameter in cross-section of the O-ring O1 is greater than the depth of the groove 51m. This causes the shaft 41b in the load transmitting member 40b to be supported by the O-ring O1 having an elastic force. In the manufacture of the load transmitting member 40b, therefore, even when errors occur in the shape and the size of the load transmitting member 40b, the load transmitting member 40b is supported within the housing 50 with the effect of the errors absorbed by the O-ring O1. As a result, the shape and dimensional accuracies of the load transmitting member 40b are alleviated. In this state, a gap G1 between an outer peripheral surface of the shaft 41b and the inner peripheral surface of the opening 51h preferably is approximately 0.1 mm, for example.

On the other hand, a circular or substantially circular opening 52h is also formed at the center of the second housing 52. The diameter of the opening 52h is greater than the diameter of the shaft 41a in the load transmitting member 40a. An annular groove 52m is formed on an inner peripheral surface of the opening 52h.

When the magnetostrictive load sensor 100a is assembled, the O-ring O4 is attached to the groove 52m, and the shaft 41a in the load transmitting member 40a is inserted into the opening 52h.

Here, the diameter in cross-section of the O-ring O4 is greater than the depth of the groove 52m. This causes the shaft 41a in the load transmitting member 40a to be supported by the O-ring O4 having an elastic force. In the manufacture of the load transmitting member 40a, therefore, even when errors occur in the shape and the size of the load transmitting member 40a, the load transmitting member 40a is supported within the housing 50 with the effect of the errors absorbed by the O-ring O4. As a result, the shape and dimensional accuracies of the load transmitting member 40a are alleviated. In this state, a gap G2 between an outer peripheral surface of the shaft 41a and the inner peripheral surface of the opening 52h is approximately 0.1 mm, for example.

As described in the foregoing, the load transmitting members 40a and 40b that support the rod 30 are positioned by the housing 50, respectively, through the O-rings O1 and O4. This allows the load transmitting members 40a and 40b to move in a very small displacement amount in a direction perpendicular or substantially perpendicular to the central axis of the magnetostrictive load sensor 100a within the housing 50 (the central axis of the housing 50).

Even when a load is applied to the load transmitting members 40a and 40b from a direction inclined to the central axis of the magnetostrictive load sensor 100a, for example, therefore, the load transmitting member 40a or 40b is elastically moved by the O-ring O1 or O4. Therefore, stress concentrations that respectively occur at the one end 30a and the other end 30b of the rod 30 are reduced due to the direction in which the load is applied. This sufficiently prevents the change in an output of the magnetostrictive load sensor 100a from varying.

Even when a vibration or a shock is given to the magnetostrictive load sensor 100a, a vibration or a shock produced in the rod 30 is absorbed by the O-rings O1 and O4. This sufficiently prevents the change in the output of the magnetostrictive load sensor 100a from varying due to the effect of the vibration or the shock produced in the rod 30.

The first housing 51 has a first outer peripheral wall 511 at its one end in a longitudinal direction and has a second outer peripheral wall 512 at the other end. The second outer peripheral wall 512 has a larger inner diameter and outer diameter than those of the first outer peripheral wall 511.

The second housing 52 has a disk 521 and an annular guide 522. The above-mentioned opening 52h is formed at the approximate center of the disk 521. The guide 522 is arranged so as to project from one surface of the disk 521.

The guide 522 introduces, when the first housing 51 and the second housing 52 are fitted to each other, the first housing 51 onto one surface of the second housing 52 such that its outer peripheral surface is abutted against an inner peripheral surface of the second outer peripheral wall 512 of the first housing 51.

An annular groove 522m is formed on the outer peripheral surface of the guide 522. When the magnetostrictive load sensor 100a is assembled, the O-ring O3 is attached to the groove 522m, so that the first housing 51 and the second housing 52 are fitted to each other. This causes the sealing properties of the housing 50 to be improved.

Furthermore, in the manufacture of the first housing 51 and the second housing 52, errors may, in some cases, occur in a fitting portion of the first housing 51 and the second housing 52. In the case, the first housing 51 and the second housing 52 are fitted to each other with the effect of the errors absorbed by the O-ring O2. As a result, the respective shape and dimensional accuracies of the first housing 51 and the second housing 52 are alleviated.

A state where the magnetic path forming member 20 is supported within the housing 50 will be described.

An annular groove 511m is formed on one end surface of the first outer peripheral wall 511. When the magnetostrictive load sensor 100a is assembled, the O-ring O2 is attached to the groove 511m. In this case, the coil 10 and the magnetic path forming member 20 are inserted into the first housing 51.

Here, the diameter in cross section of the O-ring O2 preferably is greater than the depth of the groove 511m. When the magnetic path forming member 20 is inserted into the first housing 51, therefore, one surface of the second casing 22 in the magnetic path forming member 20 is brought into contact with the O-ring O2.

In this state, the first housing 51 and the second housing 52 are fitted to each other, so that the other surface of the second casing 22 is abutted against an end surface of the guide 522 of the second housing 52.

Thus, the second casing 22 is supported by being sandwiched between the O-ring O2 having an elastic force and the guide 522. In the manufacture of the first housing 51 and the second casing 22, errors may, in some cases, occur in the respective shapes and dimensions of the first housing 51 and the second casing 22. In this case, the second casing 22 is also supported within the housing 50 with the effect that the errors are absorbed by the O-ring O2.

As a result, the respective shape and dimensional accuracies of the first housing 51 and the second casing 22 are alleviated. In this state, a gap G3 between the one surface of the second casing 22 and the end surface of the first outer peripheral wall 511 preferably is approximately 0.2 mm, for example.

The magnetic path forming member 20 is thus elastically supported by the O-ring O2 within the housing 50. Even when a vibration and a shock is applied to the magnetostrictive load sensor 100a, therefore, a vibration or a shock produced in the magnetic path forming member 20 is absorbed by the O-ring O2. Thus, the change in the output of the magnetostrictive load sensor 100a is sufficiently prevented from varying due to the effect of the vibration or the shock produced in the rod 30.

(4-c) Prevention of Shift in Position of Rod

Even when a vibration or a shock is produced in the magnetostrictive load sensor 100a, a positional relationship between the magnetic path forming member 20 and the rod 30 may, in some cases, be shifted. Even when a load is applied to a direction inclined to the central axis of the magnetostrictive load sensor 100a, a positional relationship between the magnetic path forming member 20 and the rod may, in some cases, be shifted. In such a case, both the magnetic path forming member 20 and the rod 30 are elastically supported within the housing 50, as described above. Therefore, the impedance of the sensor constituent member changes depending on an amount of the shift.

Figure 5A:
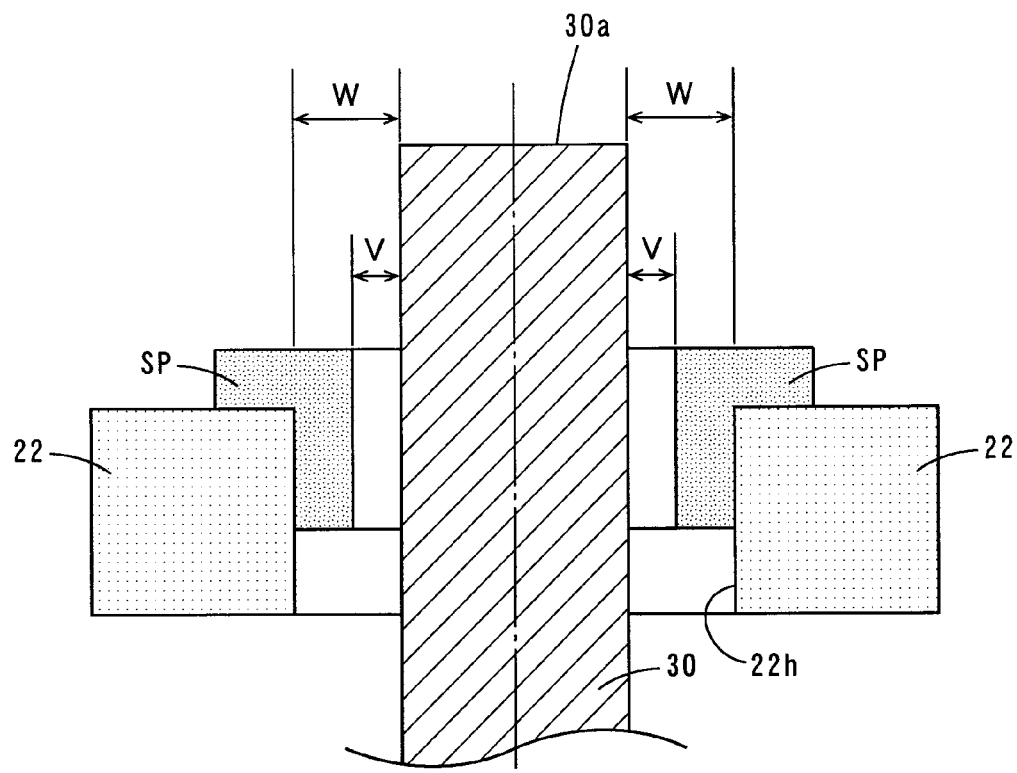
FIGS. 5A and 5B are diagrams for explaining the impedance of a sensor constituent member that changes depending on a positional relationship between a rod and a magnetic path forming member shown in FIG. 3.
Figure 5B:
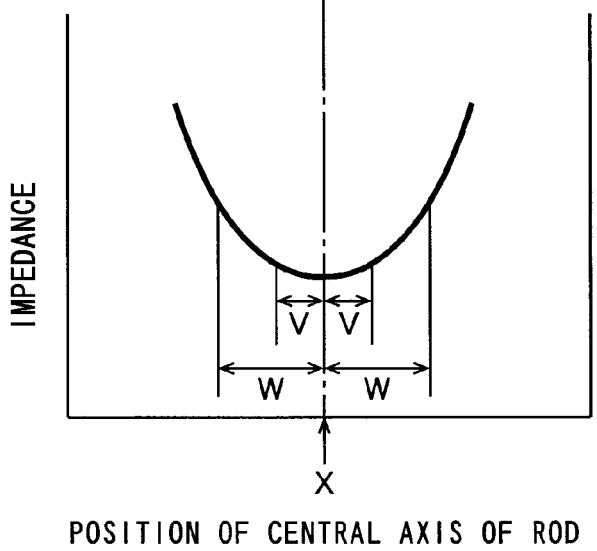

FIGS. 5A and 5B are diagrams for explaining the impedance of the sensor constituent member that changes depending on the positional relationship between the rod 30 and the magnetic path forming member 20 shown in FIG. 3. FIG. 5A is an enlarged view around the one end 30a of the rod 30 shown in FIG. 3.

As shown in FIG. 5A, the rod 30 is arranged within the magnetic path forming member 20 such that the central axis of the rod 30 is first positioned at the center of the opening 22h of the second casing 22. In this case, when the spacer SP is not provided in the opening 22h, the rod 30 is allowed to be shifted by a gap W between the outer peripheral surface thereof and the inner peripheral surface of the opening 22h.

On the other hand, when the spacer SP is provided in the opening 22h, the rod 30 is allowed to be shifted by a gap V between the outer peripheral surface thereof and the inner peripheral surface of the spacer SP.

The gap V is less than the gap W corresponding to the thickness of the spacer SP. This causes the spacer SP to limit the amount of the shift in the positional relationship between the magnetic path forming member 20 and the rod 30 to a small value.

FIG. 5B shows the relationship between the position of the central axis of the rod 30 relative to the magnetic path forming member 20 and the impedance of the sensor constituent member. In FIG. 5B, the vertical axis indicates the impedance of the sensor constituent member, and the horizontal axis indicates the position of the central axis of the rod 30 within the opening 22h. In the horizontal axis, a symbol X indicates the center of the opening 22h.

As shown in FIG. 5B, the impedance of the sensor constituent member is reduced to a minimum when the central axis of the rod 30 is positioned at the center X of the opening 22h. The impedance of the sensor constituent member quadratically increases as the central axis of the rod 30 separates from the center X of the opening 22h.

In the magnetostrictive load sensor 100a according to the specific example, the spacer SP limits the amount of the shift in the positional relationship between the magnetic path forming member 20 and the rod 30 to a small value, as described above. This causes the change in the impedance of the sensor constituent member due to the shift in the positional relationship between the magnetic path forming member 20 and the rod 30 to be sufficiently reduced. Accordingly, the stability of the output of the magnetostrictive load sensor 100a is improved.

Note that the spacer SP need not necessarily be provided. Even when the spacer SP is not provided, the same effect as the foregoing effect can be obtained by setting the gap between the constituent members within the housing 50 as follows.

As shown in FIG. 4, the gap G1 between the outer peripheral surface of the shaft 41b and the inner peripheral surface of the opening 51h and the gap G2 between the outer peripheral surface of the shaft 41a and the inner peripheral surface of the opening 52h preferably are set to the same width. A gap G4 between the outer peripheral surface of the rod 30 and the inner peripheral surface of the opening 21h and a gap G5 between the outer peripheral surface of the rod 30 and the inner peripheral surface of the opening 22h preferably are set to the same width. Furthermore, the width of the gaps G1 and G2 preferably is set to not more than the width of the gaps G4 and G5.

The gaps G1 and G2 allow the load transmitting members 40a and 40b that support the rod 30 to move in a direction crossing the central axis of the magnetostrictive load sensor 100a within the gaps. Furthermore, the gaps G4 and G5 allow the rod 30 to move in the direction crossing the central axis of the magnetostrictive load sensor 100a within the gaps.

Here, the gaps G4 and G5 are positioned inside the gaps G1 and G2 within the housing 50. Thus, the rod 30 is supported by the load transmitting members 40a and 40b. When the gaps G1, G2, G3, and G4 satisfy the foregoing relationship, therefore, an allowed movement amount of the rod 30 is limited by the gaps G1 and G2.

Therefore, in this case, the variation in the output of the magnetostrictive load sensor 100a due to the shift in the position of the rod 30 can be reduced by setting the respective widths of the gaps G1 and G2, previously considering the movement amount of the rod 30 allowed within the housing 50.

In this case, in order to reduce the shift in the position of the rod 30, the necessities of increasing the number of components, increasing the weight of the magnetostrictive load sensor 100a, and increasing the size of the magnetostrictive load sensor 100a are eliminated. This causes the magnetostrictive load sensor 100 to be miniaturized, made lightweight, and low in cost.

(4-d) Length of Rod Projecting from Magnetic Path Forming Member

Figure 6:
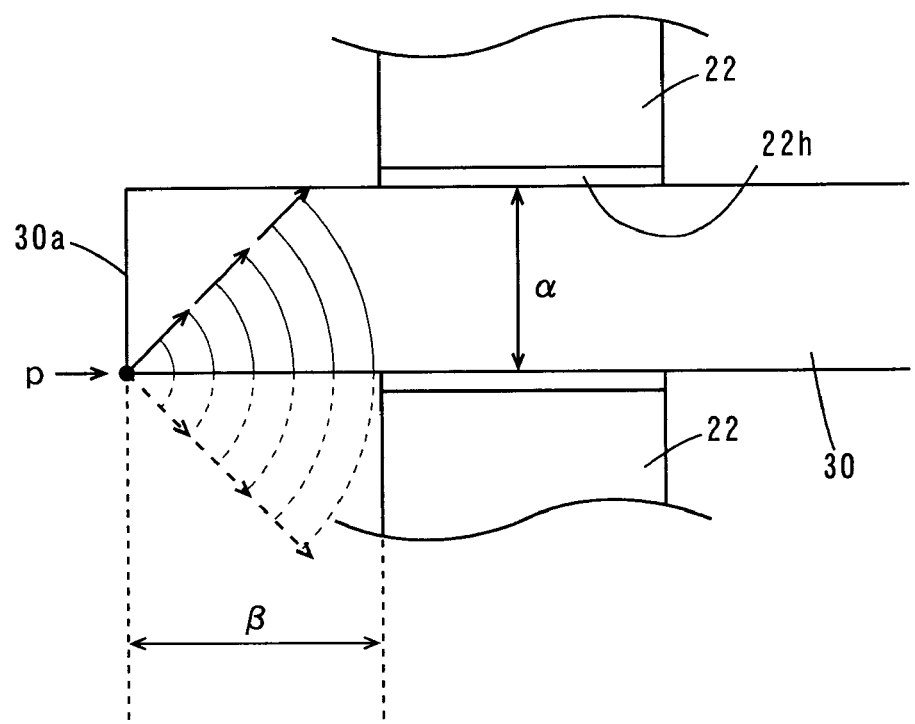
FIG. 6 is a diagram for explaining a portion, of the rod, projecting through an opening of the magnetic path forming member in the magnetostrictive load sensor shown in FIG. 3.

FIG. 6 is a diagram for explaining a portion, projecting through the opening 22h of the magnetic path forming member 20, of the rod 30. In FIG. 6, the spacer SP is omitted.

As described in the foregoing, in the specific example, the one end 30a of the rod 30 projects through the opening 22h by a length that is not less than the diameter of the rod 30. This is for the following reasons.

As shown in FIG. 6, with a load applied to the load transmitting member 40a (FIG. 3), a stress may, in some cases, be locally concentrated at both the ends of the rod 30 (see an arrow p).

The stress exerted in a locally concentrated manner at the one end 30a of the rod 30 propagates by spreading in a range of approximately 45 degrees on both sides, centered around an axis that is parallel or substantially parallel to the central axis of the rod 30.

In the specific example, the one end 30a of the rod 30 projects by a length $\beta$ that is not less than the diameter $\alpha$ of the rod 30. Even when the stress is exerted in a locally concentrated manner at an edge of the one end 30a of the rod 30, therefore, the stress spread over the whole area in cross section of the rod 30 within its projection.

Accordingly, the stress exerted on the rod 30 spreads throughout the rod 30 in a portion, inside the second casing 22, of the rod 30, that is, a portion, covered with the magnetic path forming member 20 shown in FIG. 3, of the rod 30. Therefore, a stress distribution of the rod 30 is made substantially uniform.

This prevents the coil 10 in the magnetic path forming member 20 from being affected by the non-uniform stress distribution in the rod 30. As a result, the output of the magnetostrictive load sensor 100 is prevented from being affected by the stress concentrated portion occurring in the rod C, so that the output of the magnetostrictive load sensor 100 is stabilized.

For the same reason as the foregoing, the other end 30b of the rod 30 also projects through the opening 21h by a length that is not less than the diameter of the rod 30, which is not illustrated in FIG. 6. This prevents the output of the magnetostrictive load sensor 100 from being affected by the stress concentrated portion occurring in the rod C, so that the output of the magnetostrictive load sensor 100 is sufficiently stabilized.

Although in the specific example, the rod 30 has the shape of a pillar, the rod 30 may have the shape of a polygonal column. In this case, it is preferable that both ends of the rod 30 project outward beyond the magnetic path forming member 20 by a length that is not less than the diameter of a polygonal circumcircle.

(4-e) Experiment of Magnetostrictive Load Sensor

The inventors conducted an experiment for examining, when a load is applied from a direction inclined to the central axis of a magnetostrictive load sensor in each of inventive examples and comparative examples, described below, the output characteristics of the magnetostrictive load sensor.

In the following description, an angle of inclination means an angle to the central axis of the magnetostrictive load sensor in each of the inventive examples and the comparative examples.

The inventors manufactured a magnetostrictive load sensor 100a in the inventive example having the configuration shown in FIG. 3. Therefore, a predetermined load was applied at various angles of inclination to a load transmitting member 40b in the magnetostrictive load sensor 100a, and a relative sensitivity corresponding to the sensitivity of the magnetostrictive load sensor 100a in a case where the angle of inclination was 0 degree was measured.

Here, the sensitivity is obtained by dividing a change amount of the impedance of a sensor constituent member (an impedance change amount $\Delta Z$) with a predetermined load applied to the magnetostrictive load sensor 100a by the impedance of the sensor constituent member (an initial impedance $Z_0$) with no load applied to the magnetostrictive load sensor 100a.

Furthermore, the relative sensitivity means the ratio of "the sensitivity of the magnetostrictive load sensor 100a with a predetermined load applied at any angle of inclination" to "the sensitivity of the magnetostrictive load sensor 100a with the predetermined load applied at an angle of inclination of 0 degree".

FIG. 7A shows the relationship between an angle of inclination and a relative sensitivity in a case where the magnetostrictive load sensor 100a in the inventive example is used. The vertical axis indicates a relative sensitivity, and the horizontal axis indicates an angle of inclination.

As shown in FIG. 7A, the relative sensitivity of the magnetostrictive load sensor 100a in the inventive example changed only by approximately 6% even if the angle of inclination changed from 0 degree to 30 degrees. The change in the relative sensitivity of approximately 6% is practically no problem. This has shown that in the magnetostrictive load sensor 100a in the inventive example, the output is stabilized, which makes it possible to improve the yield and reduce the cost.

On the other hand, the inventors manufactured the magnetostrictive load sensor in the comparative example, and conducted substantially the same experiment as that for the magnetostrictive load sensor 100a in the inventive example. The magnetostrictive load sensor in the comparative example used for the experiment has a configuration in which the second casing 22 in the magnetic path forming member 20 shown in FIG. 3 does not have the opening 22h and supports the one end 30a of the rod 30. The configuration of the other part of the magnetostrictive load sensor in the comparative example is the same as that of the magnetostrictive load sensor shown in FIG. 3.

FIG. 7B shows the relationship between an angle of inclination and a relative sensitivity in a case where the magnetostrictive load sensor in the comparative example is used. The vertical axis indicate a relative sensitivity, and the horizontal axis indicate an angle of inclination.

As shown in FIG. 7B, the relative sensitivity of the magnetostrictive load sensor in the inventive example changed by approximately 30% if the angle of inclination just changed from 0 degree to 30 degrees.

The foregoing has revealed that the magnetostrictive load sensor 100a in the inventive example is not more easily affected by the angle of inclination, as compared with the magnetostrictive load sensor in the comparative example.

(5) Second Specific Example of Magnetostrictive Load Sensor

A second specific example of the magnetostrictive load sensor 100 according to the first preferred embodiment will be described. The magnetostrictive load sensor according to the second specific example differs from the magnetostrictive load sensor 100a according to the first specific example in the following points.

Figure 8:
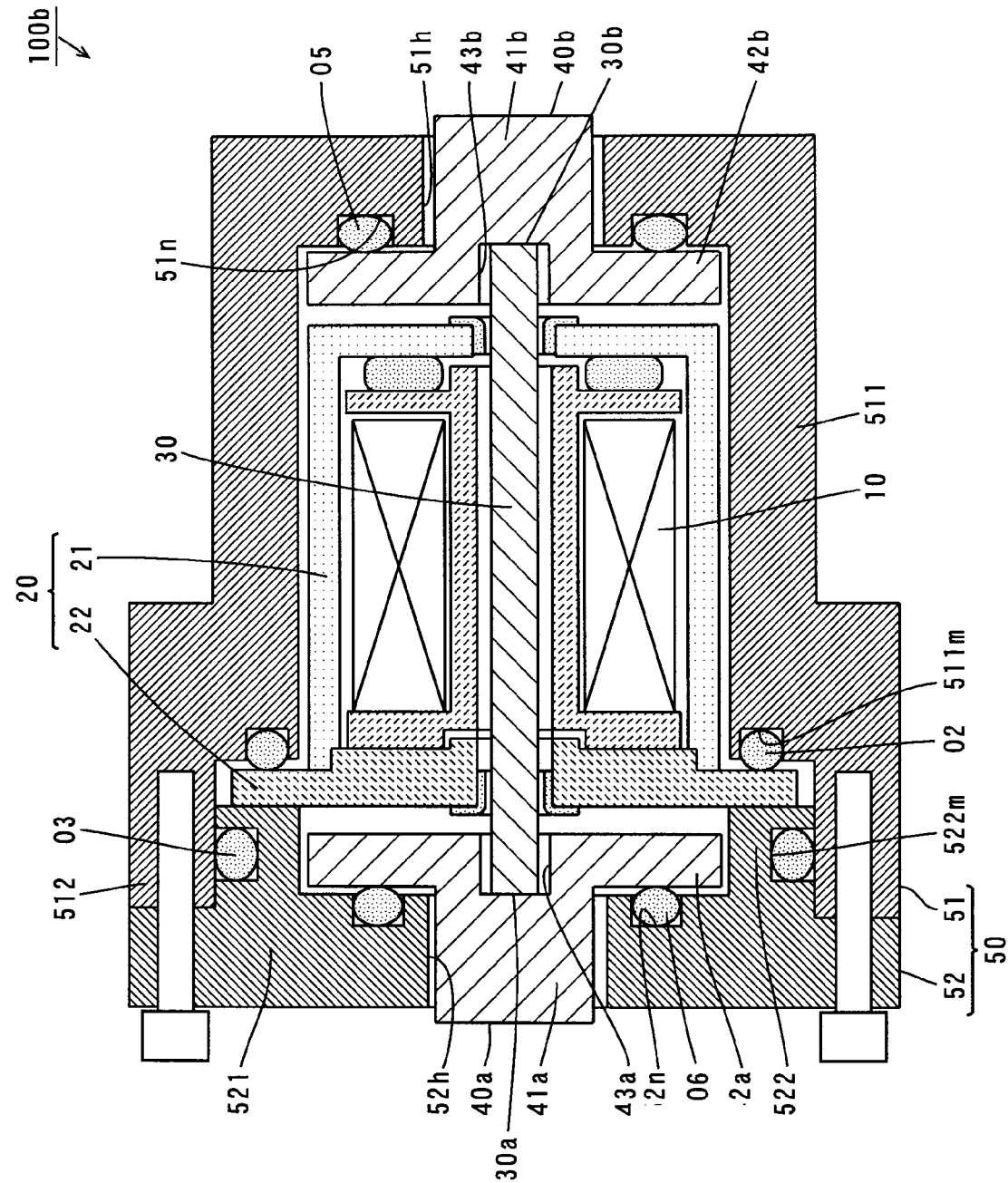
FIG. 8 is a cross-sectional view showing a second specific example of the magnetostrictive load sensor according to the first preferred embodiment of the present invention.

FIG. 8 is a cross-sectional view showing a second specific example of the magnetostrictive load sensor 100 according to the first preferred embodiment.

In a magnetostrictive load sensor 100b according to the second specific example, a first housing 51 has an annular groove 51n formed inside its one end surface instead of having the groove 51m shown in FIG. 4 formed therein. Furthermore, a second housing 52 is provided with an annular groove 52n on the side of one surface of a disk 521 instead of being provided with the groove 52m shown in FIG. 4.

When the magnetostrictive load sensor 100b is assembled, an O-ring O5 is attached to the groove 51n. Here, the diameter in cross section of the O-ring O5 is greater than the depth of the groove 51n. When an assembly including a coil 10, a magnetic path forming member 20, a rod 30, and load transmitting members 40a and 40b is inserted into the first housing 51, therefore, one surface of a flange 42b of the load transmitting member 40b is brought into contact with the O-ring O5.

Furthermore, when the magnetostrictive load sensor 100b is assembled, an O-ring O6 is attached to the groove 52n. Here, the diameter in cross section of the O-ring O6 is greater than the depth of the groove 52n. When the first housing 51 and the second housing 52 are fitted to each other, therefore, one surface of a flange 42a of the load transmitting member 40a is brought into contact with the O-ring O6.

Thus, in the manufactured magnetostrictive load sensor 100b, the load transmitting member 40b that supports the other end 30b of the rod 30 is supported by the O-ring O5 having an elastic force. Furthermore, the load transmitting member 40a that supports one end 30a of the rod 30 is supported by the O-ring O6 having an elastic force.

In this state, the O-ring O5 biases the load transmitting member 40b in a direction toward the center of the rod 30. Furthermore, the O-ring O6 also biases the load transmitting member 40a in a direction toward the center of the rod 30.

Thus, the rod 30 is supported with the elastic forces of the O-rings O5 and O6 applied in its axial direction. Even when a vibration or a shock is applied to the magnetostrictive load sensor 10b, therefore, backlash in the axial direction of the rod 30 is prevented, so that the rod 30 is prevented from being damaged.

Furthermore, the shift in the position of the rod 30 is also prevented. This causes the change in the impedance of a sensor constituent member due to the shift in the position of the rod 30 to be sufficiently reduced. Accordingly, the stability of an output of the magnetostrictive load sensor 100b is improved.

Furthermore, in the manufacture of the rod 30, the housing 50, and the load transmitting members 40a and 40b, even when errors occur in the shape and the size of each of the members, the rod 30 and the load transmitting members 40a and 40b are supported within the housing 50 with the effect of the errors absorbed by the O-rings O5 and O6. Therefore, the respective shape and dimensional accuracies of rod 30, the housing 50, and the load transmitting members 40a and 40b are alleviated.

(6) Third Specific Example of Magnetostrictive Load Sensor

A third specific example of the magnetostrictive load sensor 100 according to the first preferred embodiment will be described. The magnetostrictive load sensor according to the third specific example differs from the magnetostrictive load sensor 100b according to the second specific example in the following points.

Figure 9:
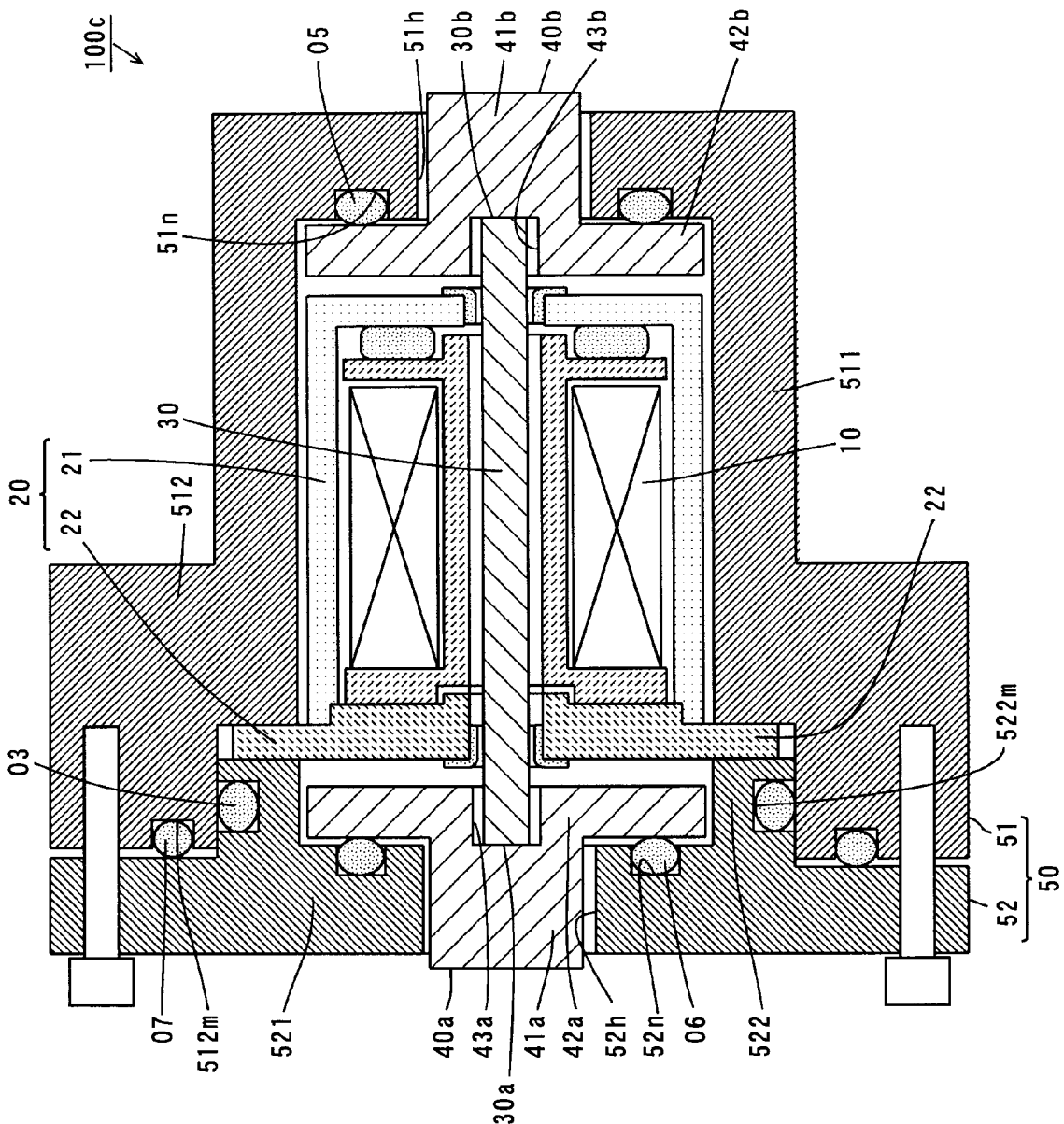
FIG. 9 is a cross-sectional view showing a third specific example of the magnetostrictive load sensor according to the first preferred embodiment of the present invention.

FIG. 9 is a cross-sectional view showing a third specific example of the magnetostrictive load sensor 100 according to the first preferred embodiment.

In a magnetostrictive load sensor 100c according to the third specific example, a second outer peripheral wall 512 of a first housing 51 is made sufficiently thicker, as compared with the outer peripheral wall 512 in the second specific example shown in FIG. 8.

The groove 511m shown in FIG. 8 is not formed on one end surface of a first outer peripheral wall 511. Instead, an annular groove 512m is formed on one end surface of the second outer peripheral wall 512.

When the magnetostrictive load sensor 100c is assembled, an O-ring O7 is attached to the groove 512m. Here, the diameter in cross section of the O-ring O7 is greater than the depth of the groove 512m. When the first housing 51 and a second housing 52 are fitted to each other, therefore, one surface of a disk 521 in the second housing 52 is brought into contact with the O-ring O7.

This further prevents the shift in the position between the first housing 51 and the second housing 52. Furthermore, the sealing properties of a housing 50 are further improved.

In the manufacture of the first housing 51 and the second housing 52, errors may, in some cases, occur in a fitting portion of the first housing 51 and the second housing 52. In such a case, the first housing 51 and the second housing 52 are also fitted to each other with the effect of the errors absorbed by an O-ring O3. As a result, the respective shape and dimensional accuracies of the first housing 51 and the second housing 52 are alleviated.

As shown in FIG. 9, in the magnetostrictive load sensor 100c according to the specific example, no O-ring is provided on the one end surface of the first outer peripheral wall 511 of the first housing 51. Therefore, a second casing 22 is supported by the one end surface of the first outer peripheral wall 511 and a guide 522 of the second housing 52.

In this case, a magnetic path forming member 20 can be firmly fixed within the housing 50. When the magnetostrictive load sensor 100c is used in an environment where no vibration and shock are produced within the housing 50, therefore, the magnetic path forming member 20 can be arranged within the housing 50 with high accuracy. Therefore, the measurement accuracy of the magnetostrictive load sensor 100c is improved.

(7) Fourth Specific Example of Magnetostrictive Load Sensor

A fourth specific example of the magnetostrictive load sensor 100 according to the first preferred embodiment will be described. The magnetostrictive load sensor according to the fourth specific example differs from the magnetostrictive load sensor 100c according to the third specific example in the following points.

Figure 10:
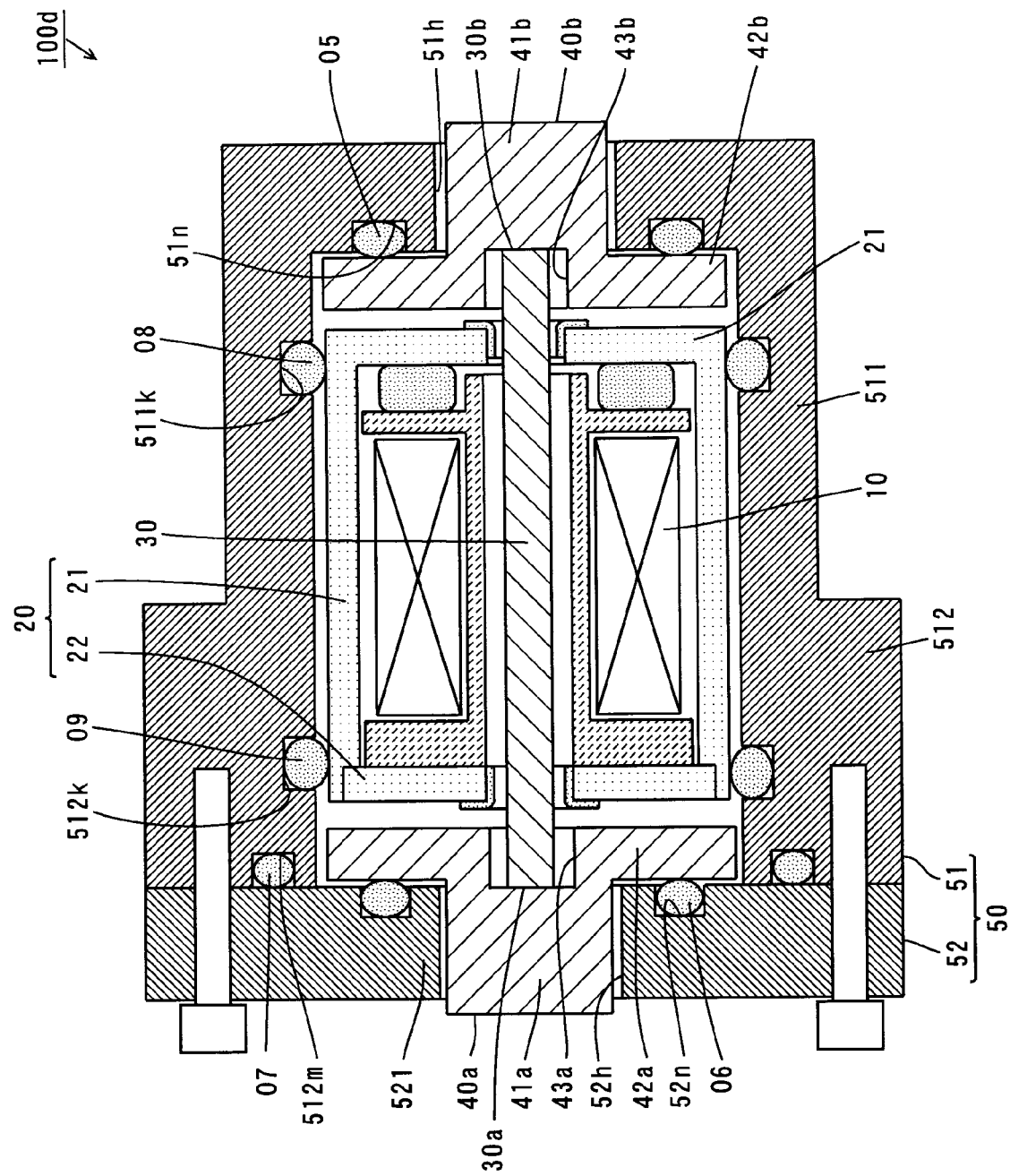
FIG. 10 is a cross-sectional view showing a fourth specific example of the magnetostrictive load sensor according to the first preferred embodiment of the present invention.

FIG. 10 is a cross-sectional view showing a fourth specific example of the magnetostrictive load sensor 100 according to the first preferred embodiment.

In a magnetostrictive load sensor 100d according to the fourth specific example, a second outer peripheral wall 512 of a first housing 51 is made sufficiently thicker, as compared with the second outer peripheral wall 512 in the second specific example, as in the third specific example. A first outer peripheral wall 511 and the second outer peripheral wall 512 are formed such that their inner peripheral surfaces are flush with each other.

Furthermore, an annular groove 511k is formed on the inner peripheral surface of the first outer peripheral wall 511, and an annular groove 512k is formed on the inner peripheral surface of the second outer peripheral wall 512.

When a magnetic path forming member 20 is inserted into the first housing 51, O-rings O8 and O9 are respectively attached to the grooves 511k and 512k. The diameters in cross section of the O-rings O8 and O9 are respectively greater than the depths of the grooves 511k and 512k. This causes the O-rings O8 and O9 to project inward from an inner peripheral surface of the first housing 51.

A second casing 22 in the magnetic path forming member 20 is formed so as to have the same shape as that on one end surface of a first casing 21. Therefore, an outer peripheral surface of the magnetic path forming member 20 is made flush.

When the magnetic path forming member 20 is inserted into the first housing 51, the outer peripheral surface of the magnetic path forming member 20 is brought into contact with the O-rings O8 and O9. This causes the magnetic path forming member 20 to be supported within the housing 50.

In the magnetostrictive load sensor 100d according to the specific example, the magnetic path forming member 20 is supported by the O-rings O8 and O9. This eliminates a configuration in which the outer diameter of the second casing 22 is made large, to sandwich a peripheral edge of the second casing 22 between the first housing 51 and a second housing 52 in order to support the magnetic path forming member 20 within a housing 50.

This eliminates the necessity of providing the second housing 52 with the guide 522 shown in FIG. 9 and the necessity of providing a step between the respective inner peripheral surfaces of the first outer peripheral wall 511 and the second outer peripheral wall 512 of the first housing 51. Therefore, the outer diameter of the magnetostrictive load sensor 100d can be reduced. As a result, the magnetostrictive load sensor 100d is miniaturized.

Furthermore, in the manufacture of the first housing 51 and the magnetic path forming member 20, even when errors occur in the respective shapes and sizes of the inner peripheral surface of the first housing 51 and the outer peripheral surface of the magnetic path forming member 20, the magnetic path forming member 20 is supported within the first housing 51 with the effect of the errors absorbed by the O-rings O8 and O9. As a result, the respective shape and dimensional accuracies of the first housing 51 and the magnetic path forming member 20 are alleviated.

(8) Fifth Specific Example of Magnetostrictive Load Sensor

A fifth specific example of the magnetostrictive load sensor 100 according to the first preferred embodiment will be described. The magnetostrictive load sensor according to the fifth specific example differs from the magnetostrictive load sensor 100a according to the first specific example in the following points.

Figure 11:
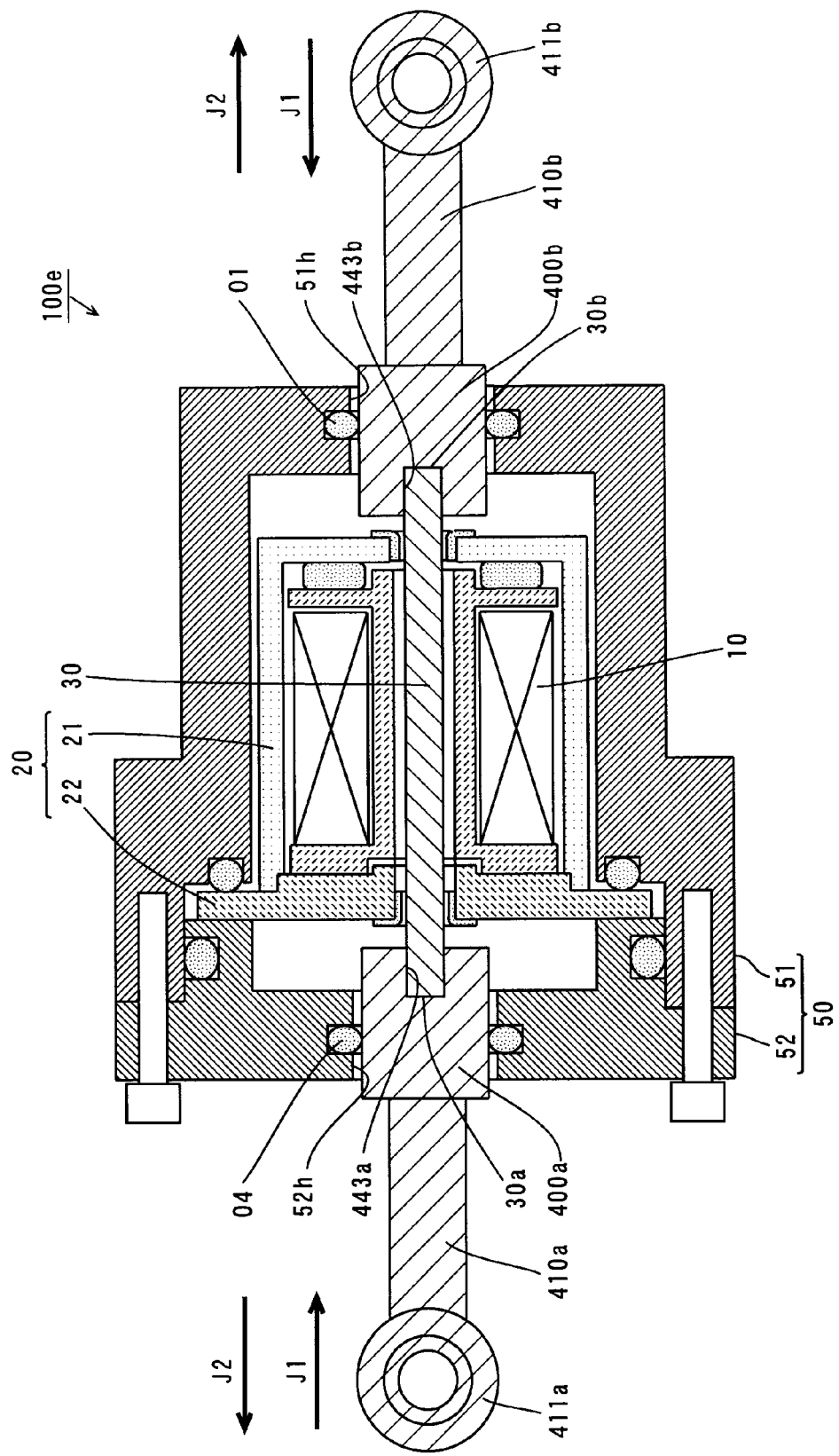
FIG. 11 is a cross-sectional view showing a fifth specific example of the magnetostrictive load sensor according to the first preferred embodiment of the present invention.

FIG. 11 is a cross-sectional view showing a fifth specific example of the magnetostrictive load sensor 100 according to the first preferred embodiment.

A magnetostrictive load sensor 100e according to the fifth specific example is provided with load transmitting members 400a and 400b that differ in the shapes from the load transmitting members 40a and 40b shown in FIG. 3 in place of the load transmitting members 40a and 40b shown in FIG. 3.

The load transmitting members 400a and 400b respectively have pillar shapes. Furthermore, circular or substantially circular recesses 443a and 443b are respectively formed at the approximate centers on one end surfaces of the load transmitting members 400a and 400b.

One end 30a of a rod 30 is inserted into the recess 443a in the load transmitting member 400a, so that the load transmitting member 400a and the rod 30 are fitted to each other. The load transmitting member 400a and the rod 30 are joined to each other preferably by screw-in, press-fit, adhesion, welding, brazing, or the like, for example.

On the other hand, the other end 30b of the rod 30 is inserted into the recess 443b in the load transmitting member 400b, so that the load transmitting member 400b and the rod 30 are fitted to each other. The load transmitting member 400b and the rod 30 are also joined to each other preferably by screw-in, press-fit, adhesion, welding, brazing, or the like, for example.

The load transmitting members 400a and 400b support the rod 30 within a housing 50. In this state, the load transmitting members 400a and 400b are respectively positioned in openings 52h and 51h and supported with elastic forces of O-rings O4 and O1.

Load transmitting shafts 410a and 410b are formed integrally with the load transmitting members 400a and 400b, respectively, so as to extend outward from the magnetostrictive load sensor 100e on the axis of the rod 30. Furthermore, annular members 411a and 411b are formed integrally with ends of the load transmitting shafts 410a and 410b, respectively.

Here, the permeability of the rod 30 changes not only when a compressive force is exerted on the rod 30 but also when a tensile force is exerted thereon. Therefore, the impedance of a sensor constituent member changes depending on the compressive force and the tensile force that are exerted on the rod 30.

According to the magnetostrictive load sensor 100e having the above-mentioned configuration, the rod 30 and the load transmitting members 400a and 400b are joined to each other. With the compressive force applied between the two annular members 411a and 411b on the axis of the rod 30, therefore, the compressive force can be detected (see an arrow J1 in FIG. 11). Furthermore, with the tensile force applied between the two annular members 411a and 411b on the axis of the rod 30, the tensile force can be detected (see an arrow J2 in FIG. 11).

[2] Second Preferred Embodiment (1) Basic Configuration of Magnetostrictive Load Sensor A magnetostrictive load sensor according to a second preferred embodiment differs from the magnetostrictive load sensor 100 according to the first preferred embodiment in the following points.

Figure 12:
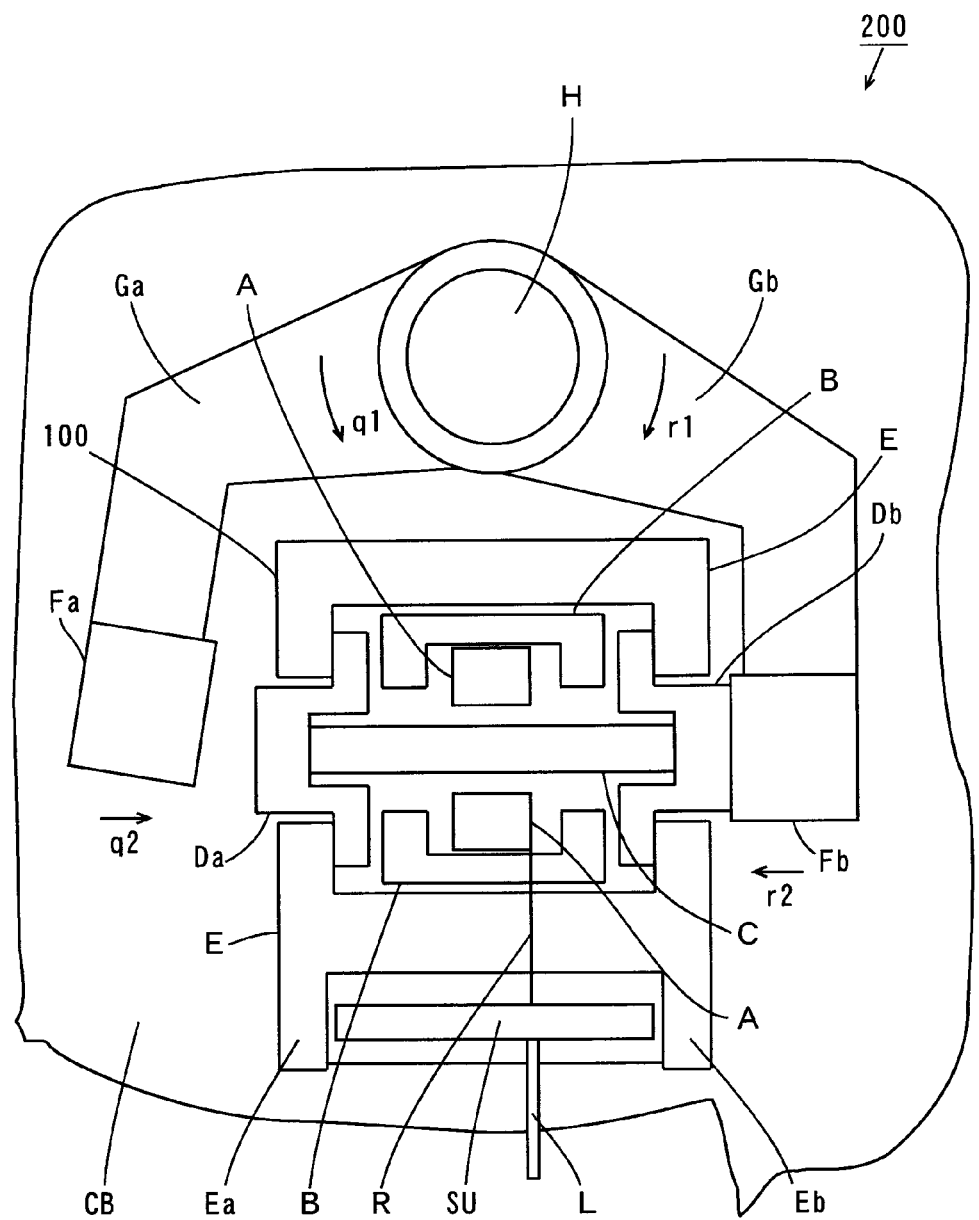
FIG. 12 is a diagram for explaining the basic configuration of a magnetostrictive load sensor according to a second preferred embodiment.

FIG. 12 is a diagram for explaining the basic configuration of a magnetostrictive load sensor 200 according to the second preferred embodiment.

As shown in FIG. 12, the magnetostrictive load sensor 200 according to the second preferred embodiment is provided on a base CB, and includes two arms Ga and Gb and a rotation shaft H in addition to the configuration of the magnetostrictive load sensor 100 according to the first preferred embodiment.

On the base CB, a housing E and the rotation shaft H are spaced a predetermined gap apart from each other.

The two arms Ga and Gb are connected to each other so as to have a substantially U shape, and are rotatably supported on the base CB by the rotation shaft H at their joint. Load applicators Fa and Fb are respectively attached to ends of the two arms Ga and Gb.

The load applicators Fa and Fb are respectively abutted against load transmitting members Da and Db supported by the housing E with the arms Ga and Gb rotating around the rotation shaft H.

As shown in FIG. 12, when the arms Ga and Gb rotate in a direction indicated by an arrow q1, the load applicator Fa attached to the arm Ga is abutted against the load transmitting member Da. This allows a load to be applied to the load transmitting member Da in a direction indicated by an arrow q2.

Furthermore, when the arms Ga and Gb rotate in a direction indicated by an arrow r1, the load applicator Fb attached to the arm Gb is abutted against the load transmitting member Db. This allows a load to be applied to the load transmitting member Db in a direction indicated by an arrow r2.

As shown in FIG. 12, the magnetostrictive load sensor 200 according to the present preferred embodiment is provided with two extensions Ea and Eb extending in a direction perpendicular or substantially perpendicular to the axial direction of a rod C from both ends surfaces of the housing E.

A substrate SU including peripheral circuits (load detecting circuits) such as an oscillating circuit, a current detector, a rectifying circuit, an amplifying circuit, and a CPU (not shown) is provided between the extensions Ea and Eb. A lead wire R pulled out of a coil A is connected to the substrate SU.

Furthermore, the substrate SU is connected to external equipment (not shown) through a cable L.

(2) Effect of Magnetostrictive Load Sensor According to Second Preferred Embodiment As described in the foregoing, in the magnetostrictive load sensor 200, the two load applicators Fa and Fb rotate around the rotation shaft H, so that loads are respectively applied to the load transmitting members Da and Db supported at both ends of the housing E.

Therefore, the directions and the positions of the loads respectively applied to the loads transmitting members Da and Db are symmetrical, so that the loads are transmitted to the rod C in symmetrical paths, respectively, when the load is applied to one end of the rod C and when the load is applied to the other end of the rod C. As a result, the loads respectively applied from the two directions can be detected with the same accuracy.

(3) Specific Example of Magnetostrictive Load Sensor

A specific example of the magnetostrictive load sensor 200 according to the second preferred embodiment will be described.

Figure 13:
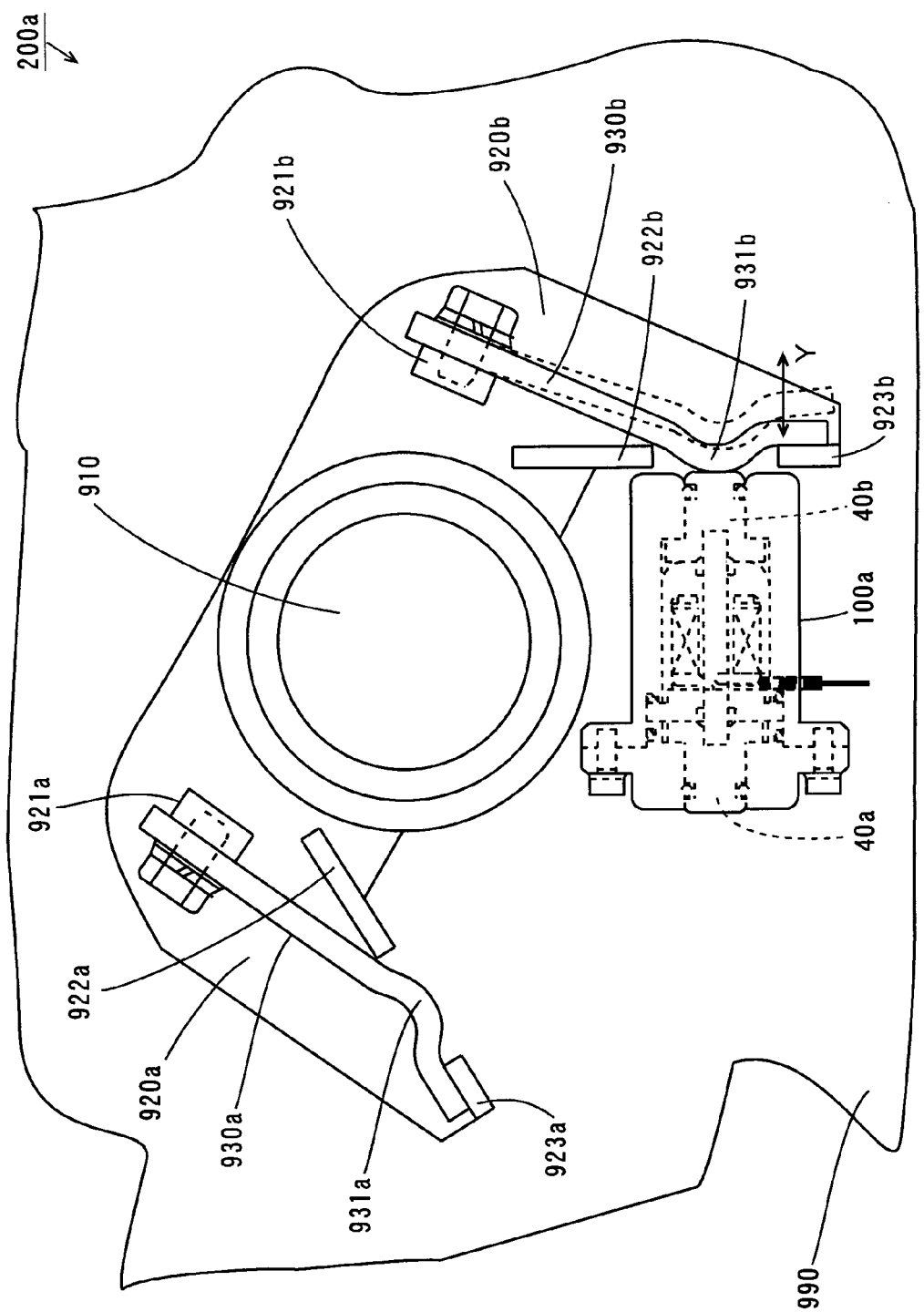
FIG. 13 is a top view showing a specific example of the magnetostrictive load sensor according to the second preferred embodiment of the present invention.

FIG. 13 is a top view showing a specific example of the magnetostrictive load sensor 200 according to the second preferred embodiment. As shown in FIG. 13, a magnetostrictive load sensor 200a according to the specific example includes the magnetostrictive load sensor 100a shown in FIG. 3 described in the first preferred embodiment, and includes arms 920a and 920b and a rotation shaft 910.

In the specific example, the magnetostrictive load sensor 100a shown in FIG. 13 corresponds to the magnetostrictive load sensor 100 shown in FIG. 12. Furthermore, the arms 920a and 920b and the rotation shaft 910 respectively correspond to the arms Ga and Gb and the rotation shaft H, described above.

As shown in FIG. 13, the magnetostrictive load sensor 200a according to the specific example is provided on a base 990.

On the base 990, the magnetostrictive load sensor 100a shown in FIG. 3 and the rotation shaft 910 are spaced a predetermined gap apart from each other.

The two arms 920a and 920b are connected to each other so as to have a substantially U shape, and are rotatably supported on the base 990 by the rotation shaft 910 at their joint.

The two arms 920a and 920b are respectively provided with leaf spring supporting members 921a and 921b. Two load limiting members 922a and 923a are spaced a predetermined gap apart from each other inside the arm 920a. Two load limiting members 922b and 923b are also spaced a predetermined gap apart from each other inside the arm 920b.

Leaf springs 930a and 930b having a longitudinal shape have their respective one ends attached to the leaf spring supporting members 921a and 921b using bolts, for example.

The other ends of the leaf springs 930a and 930b attached to the supporting members 921a and 921b respectively extend toward ends of the arms 920a and 920b.

Projections 931a and 931b are respectively formed in portions closer to the other ends of the leaf springs 930a and 930b than the centers thereof.

The projection 931a of the leaf spring 930a is positioned between the two load limiting members 922a and 923a, and projects toward the inside of the arm 920a. In this case, the leaf spring 930a is biased toward the inside of the arm 920a.

The projection 931b of the leaf spring 930b is positioned between the two load limiting members 922b and 923b, and projects toward the inside of the arm 920b. In this case, the leaf spring 930b is biased toward the inside of the arm 920b.

In the specific example, the projections 931a and 931b of the leaf springs 930a and 930b respectively correspond to the load applicators Fa and Fb shown in FIG. 12. Therefore, with the arms 920a and 920b rotating, the projections 931a and 931b are respectively abutted against load transmitting members 40a and 40b in the magnetostrictive load sensor 100a, as shown in FIG. 13. This causes loads exerted on the arms 920a and 902b to be respectively applied to the load transmitting members 40a and 40b.

In this case, the leaf springs 930a and 930b are elastically deformed, as indicated by an arrow Y in FIG. 13.

Here, when a load exerted on the arm 920b is greater than an elastic force of the leaf spring 930b, for example, the leaf spring 930b is pushed back toward the outside of the arm 920b with the projection 931b and the load transmitting member 40b abutted against each other.

The load limiting members 922b and 923b provided inside the arm 920b are abutted against one end surface of the housing 50 shown in FIG. 3. This causes the load exerted on the arm 920b to be exerted on an abutment portion of the load limiting member 922b or 923b and the one end surface of the housing 50.

The results prevent a load greater than the elastic force of the leaf spring 930b from being applied to the load transmitting member 40b and therefore, prevent the rod 30 shown in FIG. 3 from being damaged and degraded by application of an excessive load.

Although description was made of the respective functions of the leaf spring 930b and the load limiting members 922b and 923b that are provided in the arm 920b, the leaf spring 930a and the load limiting members 922a and 923a that are provided in the arm 920a also have the same functions.

Therefore, the durability of the magnetostrictive load sensor 200a according to the specific example is improved, so that long life is realized.

[3] Third Preferred Embodiment

(1) Basic Configuration of Magnetostrictive Load Sensor

A magnetostrictive load sensor according to a third preferred embodiment differs from the magnetostrictive load sensor 100 according to the first preferred embodiment in the following points.

Figure 14:
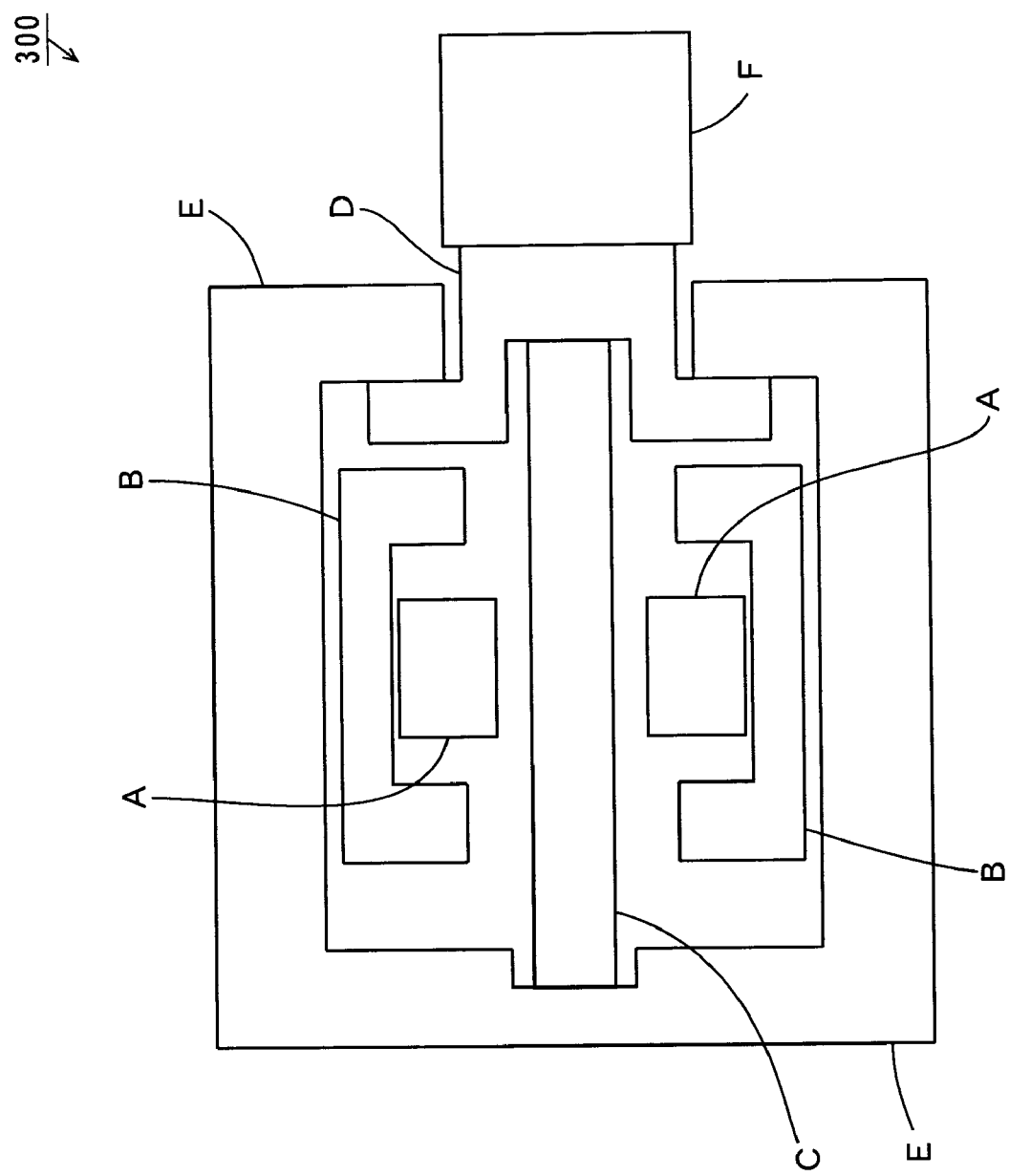
FIG. 14 is a diagram for explaining the basic configuration of a magnetostrictive load sensor according to a third preferred embodiment.

FIG. 14 is a diagram for explaining the basic configuration of a magnetostrictive load sensor 300 according to the third preferred embodiment.

As shown in FIG. 14, the magnetostrictive load sensor 300 according to the third preferred embodiment preferably is only provided with one load transmitting member D and one load applicator F.

Thus, a rod C has its one end supported by one end surface of a housing E and the other end supported by the load transmitting member D. The load applicator F is arranged so as to be abuttable against the load transmitting member D.

The above-mentioned configuration allows the magnetostrictive load sensor 300 according to the third preferred embodiment to detect only a load applied to the one end of the rod C. This eliminates the necessity of a configuration for applying a load to the other end of the rod C. As a result, the size in the axial direction of the rod C can be reduced, and the configuration is simplified, realizing lower cost. Furthermore, a setup space is reduced when it is desired to detect only the load from one direction.

In the magnetostrictive load sensor 300 according to the present preferred embodiment, both the ends of the rod C project outward beyond a magnetostrictive path forming member B. In other words, when the magnetostrictive load sensor 300 is operated, both the ends of the rod C are positioned outside a magnetic path formed by the magnetostrictive path forming member B.

As a result, an output of the magnetostrictive load sensor 300 is prevented from being affected by stress concentrated portions occurring at both the ends of the rod C. Therefore, the output of the magnetostrictive load sensor 300 is stabilized.

(2) Specific Example of Magnetostrictive Load Sensor

A specific example of the magnetostrictive load sensor 300 according to the third preferred embodiment will be described.

The magnetostrictive load sensor according to the present preferred embodiment differs from the magnetostrictive load sensor 100a shown in FIGS. 3 and 4 described in the first preferred embodiment in the following points.

Figure 15:
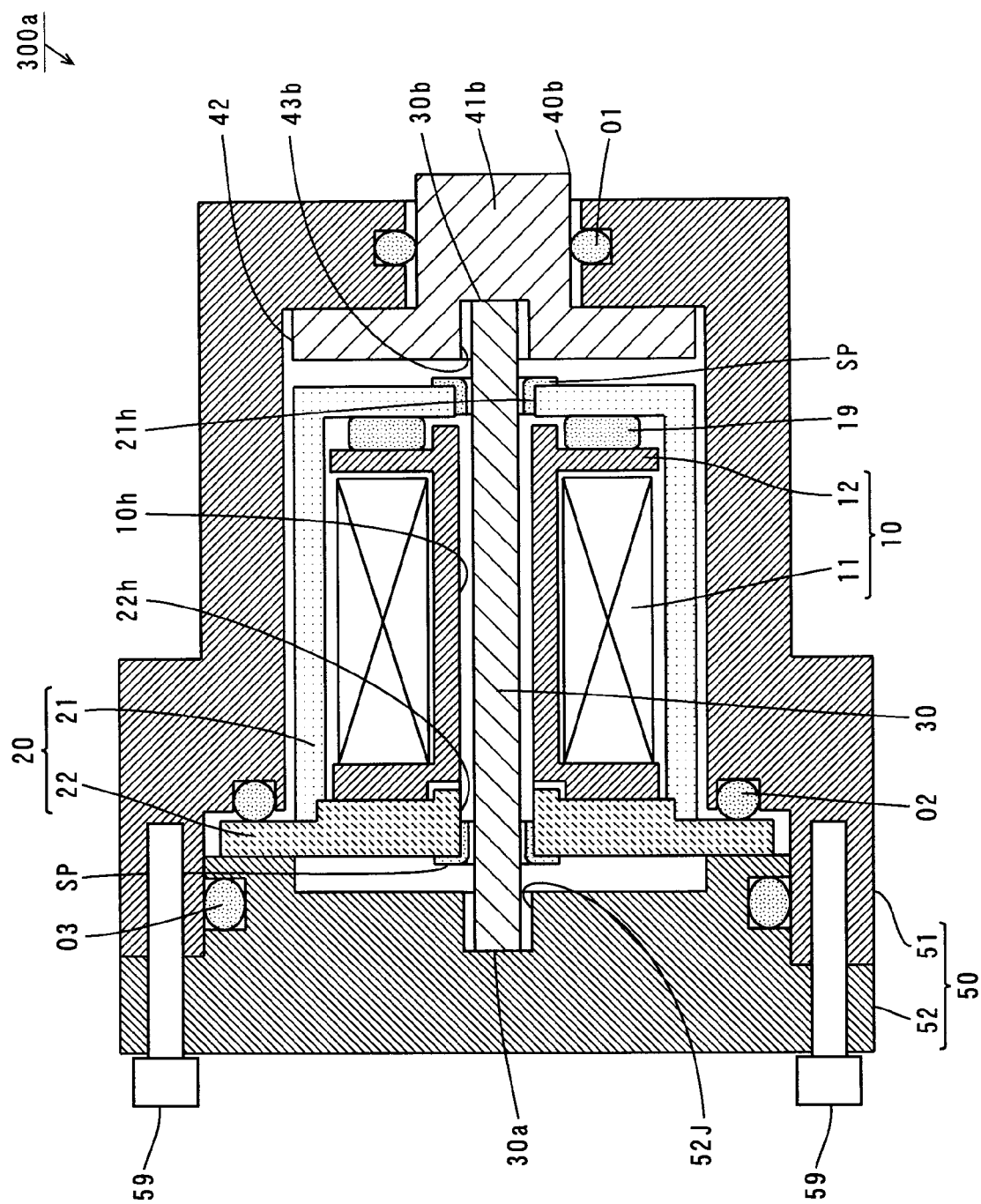
FIG. 15 is a cross-sectional view showing a specific example of the magnetostrictive load sensor according to the third preferred embodiment of the present invention.

FIG. 15 is a cross-sectional view showing a specific example of the magnetostrictive load sensor according to the third preferred embodiment. As shown in FIG. 15, a magnetostrictive load sensor 300a according to the specific example is not provided with the load transmitting member 40a shown in FIG. 3.

Furthermore, a second housing 52 constituting a housing 50 has a circular or substantially circular recess 52J provided on its one surface at the center thereof instead of having an opening 52h formed therein.

When the magnetostrictive load sensor 300a is assembled, therefore, one end 30a of a rod 30 is inserted into the recess 52J of the second housing 52. This causes the one end 30a of the rod C to be supported by the recess 52J of the second housing 52 and causes the other end 30b thereof to be supported by a load transmitting member 40b.

As a result, only when a load is applied to a portion of the load transmitting member 40b projecting from the housing 50, the magnetostrictive load sensor 300a can detect the load.

Even in the magnetostrictive load sensor 300a according to the specific example, substantially the same effect as that in the magnetostrictive load sensor 100a shown in FIG. 3 is obtained.

[4] Configuration of Load Detecting Circuit

Figure 16:
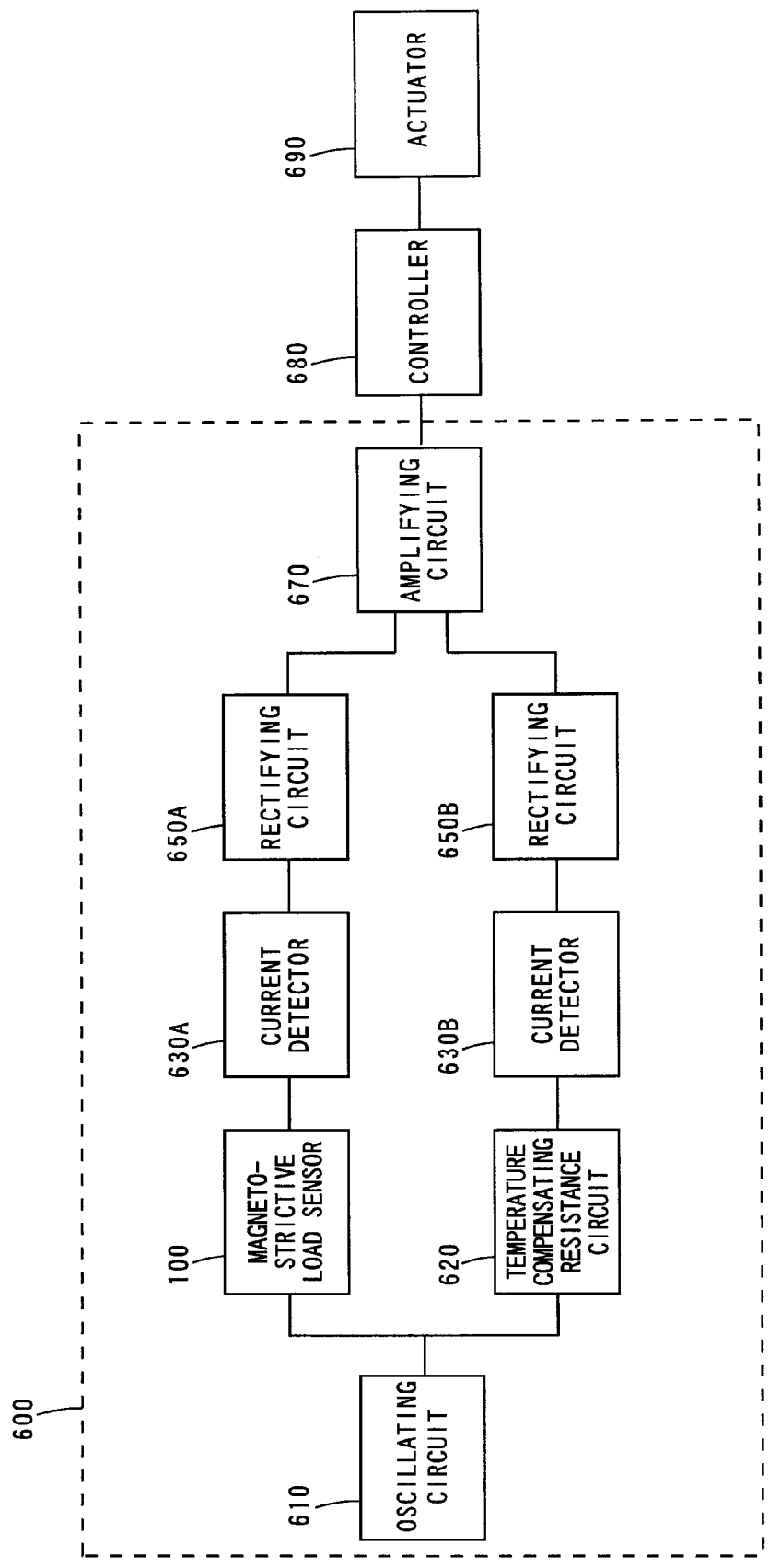
FIG. 16 is a block diagram showing the schematic configuration of a load detecting circuit using the magnetostrictive load sensor according to the above-mentioned preferred embodiment.

FIG. 16 is a block diagram showing the schematic configuration of a load detecting circuit using the magnetostrictive load sensor 100 according to the above-mentioned preferred embodiment. Note that any one of magnetostrictive load sensors 100a to 100e can be used as the magnetostrictive load sensor 100.

A load detecting circuit 600 preferably includes an oscillating circuit 610, a magnetostrictive load sensor 100, a temperature compensating resistance circuit 620, current detectors 630A and 630B, rectifying circuits 650A and 650B, and an amplifying circuit 670.

The oscillating circuit 610 feeds an oscillation signal to one end of a coil in the magnetostrictive load sensor 100 and feeds the oscillation signal to one end of the temperature compensating resistance circuit 620. The magnetostrictive load sensor 100 detects a load externally applied. The current detector 630A converts a current supplied from the other end of the coil in the magnetostrictive load sensor 100 in to a voltage. The current detector 630B converts a current supplied from the other end of the temperature compensating resistance circuit 620 into a voltage. The rectifying circuit 650A rectifies and smoothes the voltage outputted from the current detector 630A. The rectifying circuit 650B rectifies and smoothes the voltage outputted from the current detector 630B. The amplifying circuit 670 amplifies a difference between the voltage outputted from the rectifying circuit 650A and the voltage outputted from the rectifying circuit 650B.

As described in the foregoing, a load applied to the load transmitting member Da shown in FIG. 1 is transmitted to the one end of the rod C, so that a compressive force is exerted on the rod C. This causes the permeability of the rod C to change due to a magnetostrictive effect while causing the impedance of the sensor constituent member including the coil A, the magnetic path forming member B, and the rod C to change. An output signal corresponding to the change in the impedance is obtained by the amplifying circuit 670. In such a way, the load can be electromagnetically detected.

The output signal of the amplifying circuit 670 in the load detecting circuit 600 is fed to a controller 680. The controller 680 includes a CPU (Central Processing Unit), a RAM (Random Access Memory), and so on. The CPU is operated in accordance with a control program stored in the RAM. The controller 680 subjects the output signal of the amplifying circuit 670 to a predetermined operation, and feeds a control signal based on the results of the operation to an actuator 690. The actuator 690 generates a driving force in response to the control signal.

Note that the magnetostrictive load sensor 100 may be replaced with magnetostrictive load sensors 200 (200a) and 300 (300a).

[5] Planing Boat Using Magnetostrictive Load Sensor

Figure 17:
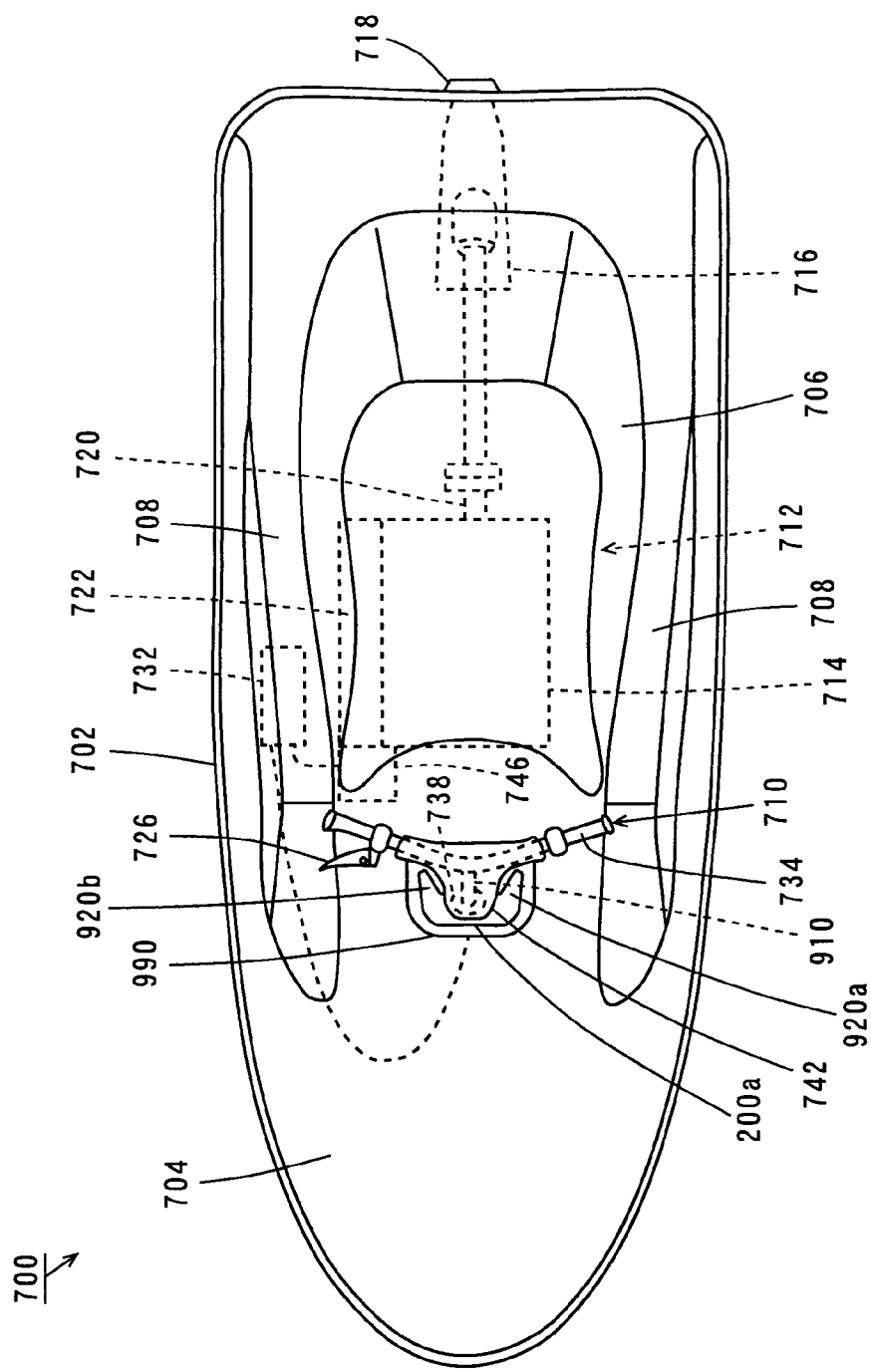
FIG. 17 is a plan view of a planing boat using the magnetostrictive load sensor shown in FIG. 13.
Figure 18:
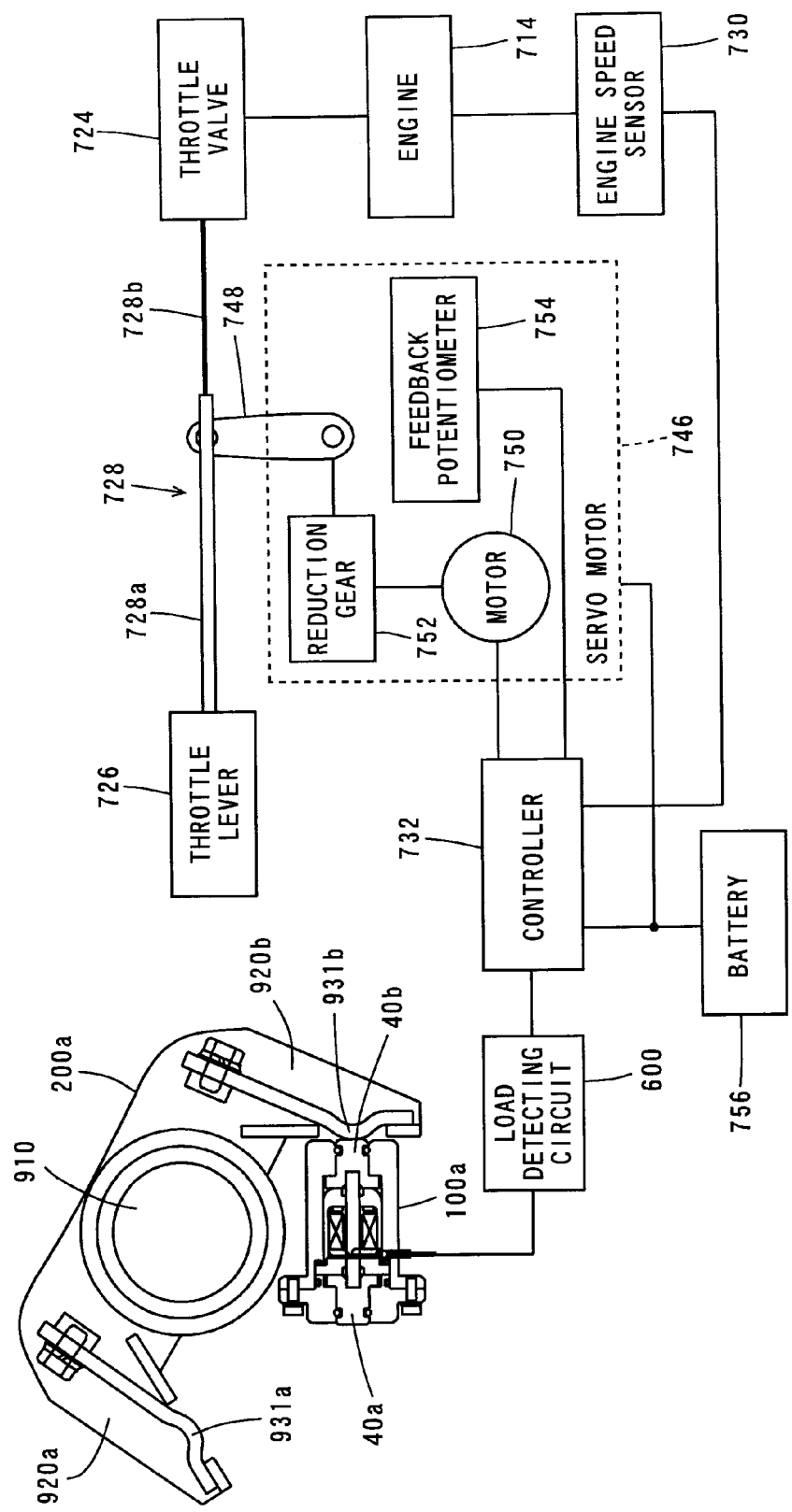
FIG. 18 is a block diagram showing a control system of the planing boat shown in FIG. 17.

FIG. 17 is a plan view of a planing boat using the magnetostrictive load sensors 200a shown in FIG. 13. FIG. 18 is a block diagram showing a control system of the planing boat shown in FIG. 17.

As shown in FIG. 17, a planing boat 700 includes a hull 702. A seat 706 on which a driver sits astride is provided on a deck 704 in an upper portion of the hull 702. Steps 708 on which the driver respectively puts his/her feet are provided on the right and left sides of the seat 706. A steering handle 710 gripped by the driver is provided ahead of the seat 706. A water jet propulsion system 712 is carried within the hull 702.

The water jet propulsion system 712 includes an engine 714 and a jet pump 716, and a nozzle deflector 718 is provided at a rear end of the jet pump 716. The water jet propulsion system 712 sucks up water from the bottom of the hull 702 by the power of the engine 714, and sprays water backward from the nozzle deflector 718 at the rear end of the jet pump 716, to obtain a thrust.

The nozzle deflector 718 is supported swingably rightward and leftward at the rear end of the jet pump 716, and is connected to a lower end of the steering handle 710 through a push-pull wire and a steering arm (not shown).

The engine 714 is a multiple cylinder engine, and is arranged such that the direction of a crankshaft 720 is the front-to-rear direction of the hull 702. A suction system 722 is connected to the right of the hull 702, and an exhaust system (not shown) is connected to the left of the hull 702. The suction system 722 includes a plurality of carburetors respectively corresponding to the cylinders of the engine 714, to supply a fuel from each of the carburetors to the corresponding cylinder. Each of the carburetors includes a throttle valve 724 shown in FIG. 18. Note that each of the throttle valves 724 is biased in the direction in which it is closed by a returning spring (not shown).

The steering handle 710 includes a handle bar 734 griped by the driver, a steering bearing 738, a rotation shaft (steering shaft) 910, and a base (attaching plate) 990. The rotation shaft 910 is attached to the center of the handle bar 734. The steering bearing 738 rotatably supports the rotation shaft 910. The base 990 fixes the steering bearing 738 to the deck 704.

The magnetostrictive load sensor 200a shown in FIG. 13 preferably is mounted on the base 990. Arms 920a and 920b of the magnetostrictive load sensor 200a are attached to the rotation shaft 910. Furthermore, a handle cover 742 is provided so as to cover the handle bar 734 and the rotation shaft 910.

A push-pull wire for steering is connected to a lower end of the rotation shaft 910 through a steering arm (not shown). With the handle bar 734 rotated rightward and leftward, the steering arm is rotated in the same direction. Therefore, the nozzle deflector 718 swings leftward or rightward through the push-pull wire.

The handle bar 734 is provided with a throttle lever 726. The throttle valves 724 (FIG. 18) are connected so as to operate simultaneously with one another. The throttle valve 724 positioned on the foremost side of the hull 702 out of the throttle valves 724 is connected to the throttle lever 726 in the steering handle 710 through a throttle wire 728 (FIG. 18). All the throttle valves 724 are opened and closed simultaneously with one another by operating the throttle lever 726.

As shown in FIG. 18, the engine 714 is provided with an engine speed sensor 730 for detecting the number of revolutions of the crank shaft 720 shown in FIG. 17. The engine speed sensor 730 sends out an engine speed signal representing the number of revolutions of an engine to a controller 732.

A servo motor 746 for throttle operation is connected to the controller 732, and a load detecting circuit 600 including a magnetostrictive load sensor 100a is connected thereto. A battery 756 feeds power to the controller 732.

The servo motor 746 includes an arm 748, a motor 750, a reduction gear 752, and a feedback potentiometer 754. The rotation of the motor 750 is decelerated by the reduction gear 752, and is transmitted to the arm 748. The feedback potentiometer 754 detects an actual swing angle of the arm 748. The controller 732 controls the motor 750 such that the detected swing angle of the arm 748 coincides with a set target angle of the arm 748. In such a way, the angle of the arm 748 is feedback-controlled in the servo motor 746.

As described above, the throttle valve 724 is connected to the throttle lever 726 through the throttle wire 728. The throttle wire 728 is inserted into the rotation shaft 910 shown in FIG. 17. The throttle wire 728 includes an outer tube 728a and an inner wire 728b. The outer tube 728a is connected to the arm 748 in the servo motor 726, and the inner wire 728b is connected to the throttle valve 724. With the arm 728 in the servo motor 746 swung, the throttle valve 724 can be opened or closed through the inner wire 728b.

The controller 732 and the servo motor 746 for throttle operation constitute a steering assist device. The steering assist device is used for improving steering properties at the time of low-speed running.

An output signal representing a load is fed to the controller 732 from the load detecting circuit 600. The controller 732 outputs, when the load represented by the output signal is greater than a predetermined value, a control signal for swinging the arm 748 to the servo motor 746. The above-mentioned predetermined value is set to a load detected by the magnetostrictive load sensor 200a when a force greater than that at the time of normal steering is applied to the handle bar 734 with the driver turning the steering handle 710 shown in FIG. 17 to the limit (at the time of the maximum steering angle).

The steering assist device causes the controller 732 to carry out steering control when the driver turns the steering handle 710 to the limit with the planing boat 700 running at low speed and further turns the steering handle 710 with a force greater than that at the time of normal steering.

In this case, the controller 732 sets the target angle of the arm 748 in the servo motor 746 on the basis of the load detected by the magnetostrictive load sensor 100a. The controller 732 feedback-controls the servomotor 746 such that the angle of the arm 748 detected by the feedback potentiometer 754 coincides with the target angle.

This causes the throttle valve 724 to be opened with an opening corresponding to the load detected by the magnetostrictive load sensor 100a (corresponding to a force applied to the steering handle 710 by the driver) while causing an output of the engine 714 to be controlled.

In this example, the controller 732 corresponds to the controller 680 shown in FIG. 16, and the servomotor 746 corresponds to the actuator 690 shown in FIG. 16.

Note that the magnetostrictive load sensor 100a used for the magnetostrictive load sensor 200a may be replaced with magnetostrictive load sensors 100b, 100c, and 100d.

[6] Power-Assisted Bicycle Using Magnetostrictive Load Sensor

Figure 19:
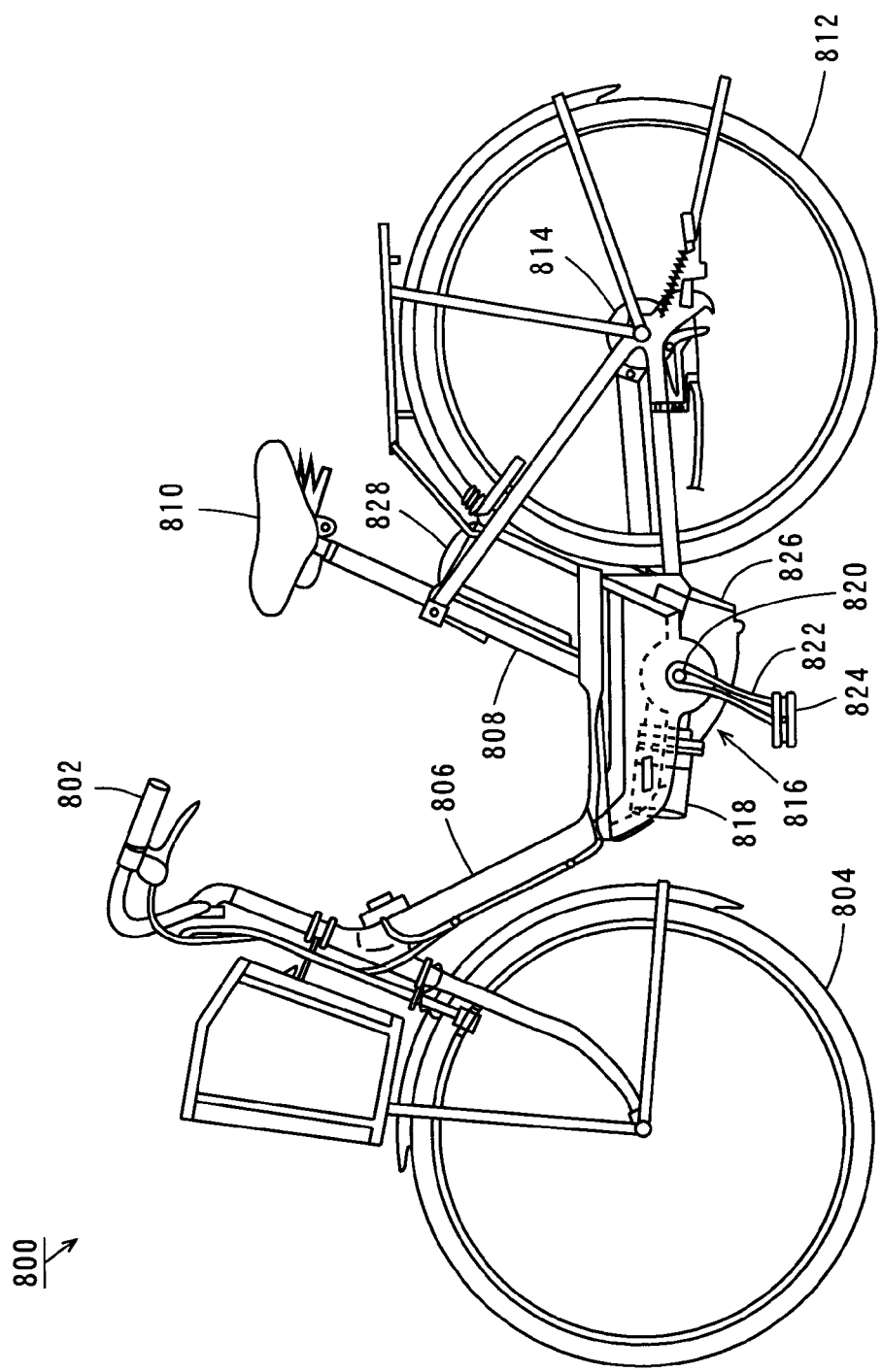
FIG. 19 is a side view of a power-assisted bicycle using the magnetostrictive load sensor shown in FIG. 15.
Figure 20:
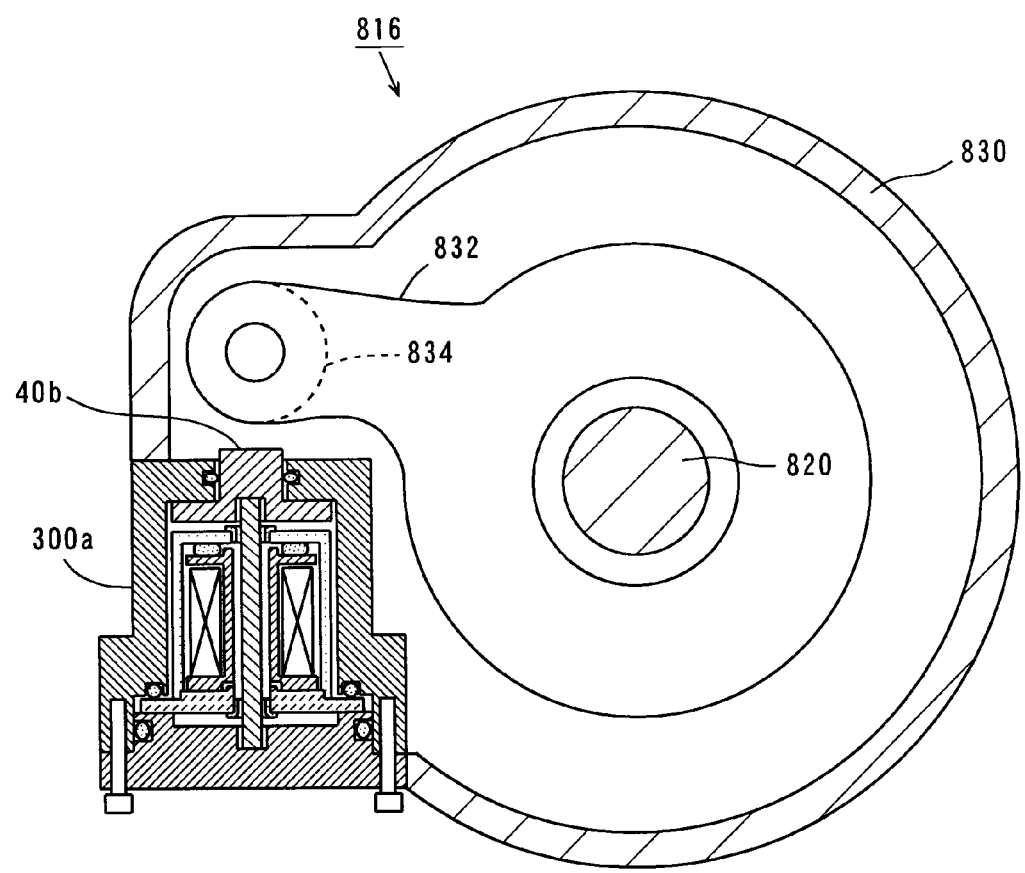
FIG. 20 is a cross-sectional view showing the configuration of a power unit used in the power-assisted bicycle shown in FIG. 19.

FIG. 19 is a side view of a power-assisted bicycle 800 using the magnetostrictive load sensor 300a shown in FIG. 15. FIG. 20 is a cross-sectional view showing the configuration of a power unit used for the power-assisted bicycle 800 shown in FIG. 19.

The power-assisted bicycle 800 shown in FIG. 19 includes a handle 802, a front wheel 804, a down tube 806, a seat tube 808, a seat (saddle) 810, a rear wheel 812, and a wheel sprocket 814. A power unit 816 is provided below a substantially central portion of the power-assisted bicycle 800.

The power unit 816 has a driving system by human power and an auxiliary power system by an electric motor 818, and synthesizes human power of a driver and auxiliary power. A crank shaft 820 is rotatably connected to the power unit 816, and cranks 822 are respectively attached to the right and left of the crank shaft 820. A pedal 824 is rotatably attached to an end of each of the cranks 822. Note that a controller 826 is connected to the power unit 816. The power unit 816 controls an output (auxiliary power) of the electric motor 818 depending on the magnitude of a torque inputted to the crank shaft 820 by the human power.

Furthermore, a battery box 828 is removably mounted in a space below the seat 810 and surrounded by the seat tube 808 and the rear wheel 812. A Ni—Cd battery (not shown) composed of a plurality of single cells shrink-packed is accommodated within the battery box 828.

When the driver works the pedal 824 to drive the rotation of the crank shaft 820, a torque inputted to the crank shaft 820 is detected by a magnetostrictive load sensor 300a shown in FIG. 20. The controller 826 controls an output (auxiliary power) of the electric power 818 depending on the detected torque.

Therefore, a resultant force of the human power and the auxiliary power proportional thereto is transmitted to the wheel sprocket 814 through a chain (not shown) from the power unit 816, so that the rotation of the wheel sprocket 814 and the rear wheel 812 is driven. This causes the power-assisted bicycle 800 to run by the human power and the auxiliary power proportional thereto.

As shown in FIG. 20, the power unit 816 includes a housing 830. The housing 830 accommodates an arm 832 connected to the crank shaft 820 and the magnetostrictive load sensor 300*a*. Furthermore, the arm 832 is connected to a roller 834 through a ring gear (not shown) in a planet gear mechanism. The roller 834 is abutted against a load transmitting member 40*b* in the magnetostrictive load sensor 300*a*.

In the power-assisted bicycle 800, a reaction force proportional to a torque transmitted from the crank shaft 820 is produced in the ring gear in the planet gear mechanism. The reaction force is exerted on the load transmitting member 40*b* in the magnetostrictive load sensor 300*a* through the roller 834. A current outputted from the magnetostrictive load sensor 300*a* is applied to the load detecting circuit 600 shown in FIG. 16. The controller 826 calculates the magnitude of the torque on the basis of an output signal of the load detecting circuit 600 shown in FIG. 16, and controls the output (auxiliary power) of the electric motor 818 depending on the torque.

Thus, the use of the magnetostrictive load sensor 300*a* allows the torque inputted to the crank shaft 820 to be accurately detected.

In this example, the controller 826 corresponds to the controller 680 shown in FIG. 16, and the electric motor 818 corresponds to the actuator 690 shown in FIG. 16.

Note that the magnetostrictive load sensor 300*a* may be replaced with magnetostrictive load sensors 100*a*, 100*b*, and 100*d*.

[7] Another Preferred Embodiment

The magnetostrictive load sensors 100*a*, 100*b*, 100*c*, 100*d*, 100*e*, 200*a*, and 300*a* according to the above-described preferred embodiments may preferably be applied to not only the planing boat and the power-assisted bicycle but also transport equipment such as a motorcycle, a water bike, and an electric wheelchair. Alternatively, they are applicable to not only transport equipment but also various types of movable objects such as a mobile rack.

[8] Correspondence Between Elements in the Claims and Elements in Preferred Embodiments In the following two paragraphs, non-limiting examples of correspondences between various elements recited in the claims below and those described above with respect to various preferred embodiments of the present invention are explained.

In the magnetostrictive load sensor according to the preferred embodiments described above, the respective through holes A*h* and 10*h* of the coils A and 10 correspond to a through hole, the coils A and 10 correspond to a coil, the openings B*ha* and 21*h* correspond to a first opening, and the openings B*hb* and 22*h* correspond to a second opening.

The magnetic path forming members B and 20 correspond to a magnetic path forming member, the rods C and 30 correspond to a load detector, the load transmitting members D*a*, D*b*, 40*a*, and 40*b* correspond to a load transmitting member or first and second load transmitting members, and the housings E and 50 correspond to a supporting member.

Furthermore, the spacer SP corresponds to a gap forming member, O-rings O1, O4, O5, and O6 correspond to an elastic member, the housings E and 50 correspond to a housing, and the gaps G4 and G5 corresponds to a first gap.

Furthermore, the openings E*ha*, E*hb*, 51*h*, and 52*h* correspond to a third opening and a fourth opening, the gaps G1 and G2 correspond to a second clearance, the recesses 43*a* and 43*b* correspond to a recess or first and second recesses, the load applicators F*a* and F*b* and the projections 931*a* and 931*b* correspond to first and second load applicators.

Furthermore, the planing boat 700 corresponds to a movable object, the hull 702 corresponds to a main body, the engine 714 corresponds to a driving unit, and the controller 734 and the servomotor 746 correspond to a controller.

Furthermore, the power-assisted bicycle 800 corresponds to a movable object, the down tube 806 and the seat tube 803 correspond to a main body, the power unit 816 corresponds to a driving unit, and the controller 826 corresponds to a controller.

Various preferred embodiments of the present invention can be effectively utilized for detecting a load in transport equipment such as planing boats, power-assisted bicycle, motorcycles, water bikes, and electric wheelchairs, or various types of movable objects such as mobile racks.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A magnetostrictive load sensor comprising:
   a coil having a through hole;
   a load detector inserted into said through hole;
   a magnetic path forming member arranged to cover an outer periphery and both ends of said coil and to form a magnetic path through which a magnetic flux generated by said coil passes such that both ends of said load detector respectively project outward beyond portions of said magnetic path forming member, which is opposite to said through hole;
   a load transmitting member arranged to transmit a load externally applied to at least one end of said load detector; and
   a supporting member arranged to support said magnetic path forming member and said load transmitting member; wherein
   said supporting member is arranged to support said load detector through said load transmitting member such that said load detector and said magnetic path forming member are not brought into contact with each other.

2. The magnetostrictive load sensor according to claim 1, wherein said supporting member is arranged to support said load detector through said load transmitting member such that said load detector is movable in a predetermined range.

3. The magnetostrictive load sensor according to claim 1, wherein a gap forming member composed of a non-magnetic material is located between said load detector and said magnetic path forming member.

4. The magnetostrictive load sensor according to claim 1, wherein said supporting member is arranged to support said load transmitting member such that said load transmitting member is movable in a predetermined range.

5. The magnetostrictive load sensor according to claim 4, wherein said supporting member is arranged to support said load transmitting member through an elastic body.

6. The magnetostrictive load sensor according to claim 1, wherein said supporting member includes a housing accommodating said coil, said magnetic path forming member, said load detector, and said load transmitting member.

7. The magnetostrictive load sensor according to claim 6, wherein said magnetic path forming member has first and second openings in portions which are respectively opposite to both ends of said through hole, first gaps are respectively formed between an outer surface of said load detector and inner surfaces of said first and second openings, said housing has a third opening in which said load transmitting member is fitted such that said load detector and said load transmitting member are integrally movable in a predetermined range, a second gap is formed between an outer surface of said load transmitting member and an inner surface of said third opening, and the width of said second gap is not more than the width of said first gap.

8. The magnetostrictive load sensor according to claim 6, wherein said magnetic path forming member includes first and second openings in portions which are respectively opposite to both ends of said through hole, first gaps are respectively formed between an outer surface of said load detector and inner surfaces of said first and second openings, said housing has a third opening in which said load transmitting member is fitted such that said load detector and said load transmitting member are integrally movable in a predetermined range, a second gap is formed between an outer surface of said load transmitting member and an inner surface of said third opening, the width of said second gap is not more than the width of said first gap, a load applicator arranged to apply a load to said load detector through said load transmitting member, said load applicator being arranged so as to be movable in a range greater than the width of said first gap in a direction that is substantially perpendicular to the axial direction of said through hole.

9. The magnetostrictive load sensor according to claim 6, wherein said housing has a third opening in which said load transmitting member is fitted, and said load transmitting member has a flange that is opposite to or brought into contact with one inner end surface of said housing and a recess in which the end of said load detector is fitted.

10. The magnetostrictive load sensor according to claim 9, wherein a gap is formed between an inner surface of said third opening of said housing and an outer surface of said load transmitting member, and further comprising an elastic member that holds said load transmitting member so as to be movable relative to said housing in a direction that is substantially perpendicular to the axial direction of said through hole.

11. The magnetostrictive load sensor according to claim 6, wherein said load detector includes first and second load transmitting members arranged to respectively transmit the load externally applied to the end and the other end of said load detector, said housing has a third opening in which said first load transmitting member is fitted and a fourth opening in which said second load transmitting member is fitted, said first load transmitting member has a first flange that is opposite to or brought into contact with one inner end surface of said housing and a first recess in which the one end of said load detector is fitted, and said second load transmitting member has a second flange that is opposite to or brought into contact with the other inner end surface of said housing and a second recess in which the other end of said load detector is fitted.

12. The magnetostrictive load sensor according to claim 11, wherein a gap is formed between an inner surface of said third opening of said housing and an outer surface of said first load transmitting member, and a gap is formed between an inner surface of said fourth opening of said housing and an outer surface of said second load transmitting member, and further comprising a first elastic member that is arranged to hold said first load transmitting member so as to be movable relative to said housing in a direction that is substantially perpendicular to the axial direction of said through hole, and a second elastic member that is arranged to hold said second load transmitting member so as to be movable relative to said housing in the direction that is substantially perpendicular to the axial direction of said through hole.

13. The magnetostrictive load sensor according to claim 1, further comprising a load applicator arranged so as to be movable in a predetermined range and so as to be abuttable against said load transmitting member so as to apply a load to said load detector through said load transmitting member.

14. The magnetostrictive load sensor according to claim 1, wherein said load transmitting member includes first and second load transmitting members that respectively transmit the load externally applied to the one end and the other end of said load detector.

15. The magnetostrictive load sensor according to claim 14, further comprising first and second load applicators that are arranged so as to be movable in a predetermined range and so as to be abuttable against said load transmitting member and respectively apply the load to the one end and the other end of said load detector through said first and second load transmitting members.

16. The magnetostrictive load sensor according to claim 15, wherein said first and second load applicators and said first and second load transmitting members are arranged so as to be symmetrical about said load detector along the axis of said through hole of said coil.

17. The magnetostrictive load sensor according to claim 1, wherein said load detector and said load transmitting member are joined to each other.

18. The magnetostrictive load sensor according to claim 1, wherein said magnetic path forming member has first and second openings in portions which are respectively opposite to both ends of said through hole, said load detector has a pillar shape, and both ends of said load detector respectively project through the first and second openings of said magnetic path forming member by a length that is not less than the diameter of a cross section in the axial direction of the load detector.

19. A movable object comprising:
   a main body;
   a driving unit arranged to move said main body;
   a magnetostrictive load sensor arranged to detect a load; and
   a controller arranged to control said driving unit on the basis of the load detected by said magnetostrictive load sensor; wherein
   said magnetostrictive load sensor includes:
      a coil having a through hole;
      a load detector inserted into said through hole;
      a magnetic path forming member arranged to cover an outer periphery and both ends of said coil to form a magnetic path through which a magnetic flux generated by said coil passes and such that both ends of said load detector respectively project outward beyond portions of said magnetic path forming member, which is opposite to said through hole;

a load transmitting member arranged to transmit a load externally applied to at least one end of said load detector; and a supporting member arranged to support said magnetic path forming member and said load transmitting member; wherein said supporting member is arranged to support said load detector through said load transmitting member such that said load detector and said magnetic path forming member are not brought into contact with each other.

* * * * *